United States Patent

James et al.

[15] 3,647,973

[45] Mar. 7, 1972

[54] COMPUTER SYSTEM UTILIZING A TELEPHONE AS AN INPUT DEVICE

[72] Inventors: Peter James; Martin J. Brennan, both of Washington, D.C.; Ben E. Kappes, Lanham, Md.

[73] Assignee: said James, by said Brennan and Kappes

[22] Filed: Dec. 4, 1967

[21] Appl. No.: 687,802

[52] U.S. Cl. .......................179/2 DP, 179/84 VF, 340/172.5

[51] Int. Cl. ..........................................................H04m 41/06

[58] Field of Search...............340/347 DD, 172.5; 179/2 DP, 179/16.09, 84 VF; 234/121

[56] References Cited

UNITED STATES PATENTS

| | | | |
|---|---|---|---|
| 2,847,508 | 8/1958 | Holden | 179/16 |
| 2,398,755 | 4/1946 | Shepherd | 179/4 |
| 3,526,892 | 9/1970 | Bartlett et al. | 178/17 |
| 3,344,401 | 9/1967 | MacDonald | 340/172.5 |
| 3,305,839 | 2/1967 | Looschen | 340/172.5 |
| 3,289,083 | 11/1966 | Barr et al. | 325/59 |
| 3,288,932 | 11/1966 | Cleary et al. | 179/2 |
| 3,381,276 | 4/1968 | James | 340/172.5 |
| 3,350,706 | 10/1967 | Krantz | 340/347 |
| 3,305,635 | 2/1967 | Kadis | 178/66 |
| 3,242,323 | 3/1966 | Marasco | 340/347 |
| 3,012,711 | 12/1961 | Croll | 234/121 |
| 2,934,754 | 4/1960 | Jackel | 340/347 |
| 2,680,781 | 6/1954 | Avery | 340/347 |

*Primary Examiner*—Kathleen H. Claffy
*Assistant Examiner*—Tom D'Amico
*Attorney*—Misegades & Douglas

[57] ABSTRACT

A system effecting automatic remote control of a computer or computer device through existing telephones. A telephone technique is disclosed providing a selective generation of a plurality of output signals. These output signals are decoded and then encoded by a programmed translator device in a manner so as to effect operation of any desired computer mechanism.

34 Claims, 11 Drawing Figures

FIG. 1
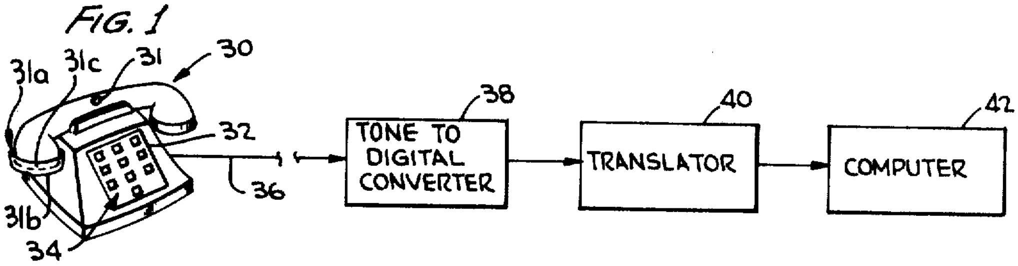
FIG. 2
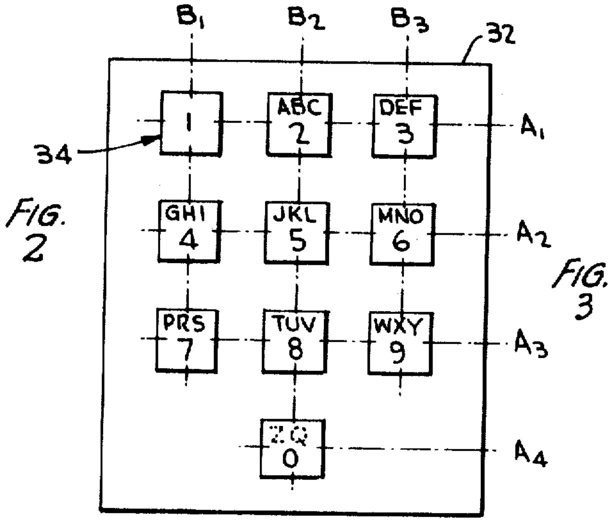
FIG. 3
| Nº | DISCRETE OUTPUTS | KEY |
|---|---|---|
| 1 | $A_1-B_1$ | 1 |
| 2 | $A_1-B_2$ | 2 |
| 3 | $A_1-B_3$ | 3 |
| 4 | $A_2-B_1$ | 4 |
| 5 | $A_2-B_2$ | 5 |
| 6 | $A_2-B_3$ | 6 |
| 7 | $A_3-B_1$ | 7 |
| 8 | $A_3-B_2$ | 8 |
| 9 | $A_3-B_3$ | 9 |
| 10 | $A_4-B_2$ | 0 |
| 11 | $A_1$ | (1-2) (2-3) (1-3) |
| 12 | $A_2$ | (4-5) (5-6) (4-6) |
| 13 | $A_3$ | (7-8) (8-9) (7-9) |
| 14 | $B_1$ | (1-4) (4-7) (1-7) |
| 15 | $B_2$ | (2-5) (2-8) (2-0) (5-8) (8-0) (5-0) |
| 16 | $B_3$ | (3-6) (6-9) (3-9) |
FIG. 4
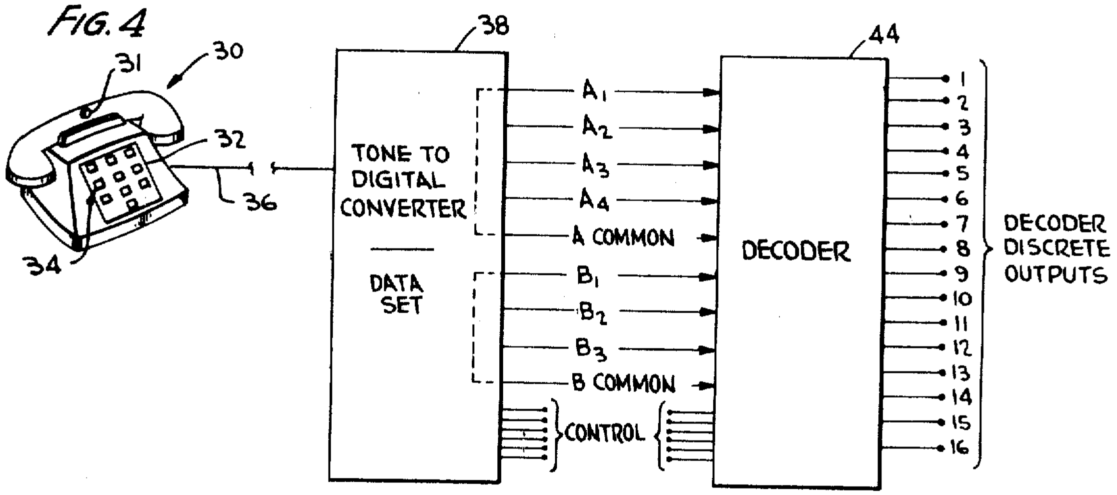

FIG. 8

| ALPHA CHARACTER | ALPHA MODE | KEYING |
|---|---|---|
| A | 1 | 2 |
| B | 2 | 2 |
| C | 3 | 2 |
| D | 1 | 3 |
| E | 2 | 3 |
| F | 3 | 3 |
| G | 1 | 4 |
| H | 2 | 4 |
| I | 3 | 4 |
| J | 1 | 5 |
| K | 2 | 5 |
| L | 3 | 5 |
| M | 1 | 6 |
| N | 2 | 6 |
| O | 3 | 6 |
| P | 1 | 7 |
| Q | 3 | 0 |
| R | 2 | 7 |
| S | 3 | 7 |
| T | 1 | 8 |
| U | 2 | 8 |
| V | 3 | 8 |
| W | 1 | 9 |
| X | 2 | 9 |
| Y | 3 | 9 |
| Z | 2 | 0 |

| FUNCTION OR NUMERIC CHARACTER | MODE | KEYING |
|---|---|---|
| 1 | Numeric | 1 |
| 2 | Numeric | 2 |
| 3 | Numeric | 3 |
| 4 | Numeric | 4 |
| 5 | Numeric | 5 |
| 6 | Numeric | 6 |
| 7 | Numeric | 7 |
| 8 | Numeric | 8 |
| 9 | Numeric | 9 |
| 0 | Numeric | 0 |
| Alpha 1 Shift | Any | Twin 2-3 |
| Alpha 2 Shift | Any | Twin 5-6 |
| Alpha 3 Shift | Any | Twin 8-9 |
| Num. Shift | Any | Twin 4-7 |
| Twin - Tag | Numeric | Twin 5-8 |
| Space | Any | Twin 6-9 |
| Error Release | Alpha 1 | Twin 5-8 |
| Man. Skip | Alpha 2 | Twin 5-8 |
| Man. Dup. | Alpha 3 | Twin 5-8 |
| .(period) | Alpha 1 | 0 |
| Rel. & Feed * | Alpha 1 | 1 |
| $ | Alpha 2 | 1 |
| End ◊ | Alpha 3 | 1 |
| | | |
| | | |
| | | |

FIG. 7

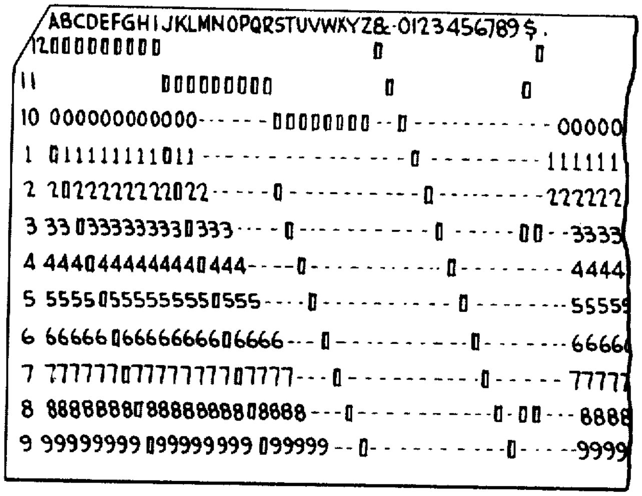

Patented March 7, 1972 3,647,973

5 Sheets-Sheet 5

COMPUTER SYSTEM UTILIZING A TELEPHONE AS AN INPUT DEVICE

This application is related to copending application Ser. No. 487,391 now U.S. Pat. No. 3,381,276 issued Apr. 30, 1968.

This invention generally relates to computer systems and is particularly concerned with a translator system and technique for coupling or interconnecting a telephone handset to a computer or computer device, such as a card punch.

The use of computer services including the services of any automatic data processing or handling machine has spread widely in recent years. The state of the art has greatly advanced from the point wherein only large corporations and the like could effectively utilize computer techniques due to the high cost involved. Tracing the development of the field, time-sharing plans were initiated whereby several organizations could effectively utilize a single computer by sharing the available time thereof. Accordingly, with such time-sharing plans or arrangements, computer services were made somewhat less expensive and thus became available to a wider segment of the general public.

However, even with these time-sharing arrangements, difficulties still were encountered in the actual handling of the information to be fed into the computer. Basically, such time-sharing plans required that data be physically delivered to a given location and/or special equipment be placed in a user's business location so as to transmit data to and control the computer.

In an effort to circumvent this information-handling bottleneck, consideration was given to the possibility of utilizing an available communication system for the purposes of feeding data and instructions or command signals to a computer. Specifically, it was suggested that existing telephone systems and networks be utilized to directly control computer operation. Such suggestions were based upon the realization that certain types of telephones, such as so-called "pushbotton" or "touch-tone" telephone sets as manufactured by American Telephone & Telegraph Company (1) developed discrete frequency signals corresponding to the numbers 0 through 9 on the keyboard of the handset, and (2) that these frequency signals might be well utilized for data and command inputs to a remote computer.

However, even the utilization of existing telephone systems to effect control of a computer had its drawbacks. For one, on a 10-button telephone handset, for example, it apparently was only possible to develop 10 discrete frequency signals corresponding to the numbers 0 through 9. Thus, while it was possible to transmit discrete signals corresponding to the 10 digits of the decimal system through the existing telephone matrices to a computer, this apparent limitation in the number of possible discrete frequency signals posed rather significant problems.

For example, even in the simplest mode of purely numeric data operation, it is necessary to develop and transmit "control" signals as well as "data" signals indicative of the particular digits 0–9. The prior art developed certain telephone utilization techniques wherein, for example, if a user thereof wished to add the digits 111 and 236, this data was fed to the computer by depressing the "1" button on the telephone keyboard three times in quick sequence and similarly, thereafter depressing the "2" "3" and "6" buttons in quick sequence. A "control" signal, however, still had to be developed both to separate the respective data numbers and to indicate to the computer that the particular numbers received were to be added. The difficulties encountered at this point were seemingly insurmountable since, if any one of the buttons 0 through 9 on the telephone were designated a "control" button the depression of which would indicate an "addition" control function for example, then this particular button would not be available for the transmission of numerical data. Accordingly, specialized and complex modification to the telephone handset or the utilization of a "pushbutton" phone with greater than 10 buttons were thought to be necessary in order to preserve the "data" transmission capacity of the telephone, with the depression of the additional "pushbutton," for example, indicating the particular "control" function desired.

The above difficulties encountered when attempting to utilize an ordinary "pushbutton" telephone handset for strictly numerical operations are, of course, greatly increased when one desires to utilize the "pushbutton" telephone handset to transmit discrete alpha-numeric signals representative of the 26 letters of the alphabet as well as the 10 digits of the decimal system to a computer device such as a card punch, for example. Some technique had to be developed to indicate to the computer device when a numeral was being sent, when a particular letter of the alphabet was being sent, and when a "command" or "control" signal was being sent. Again, without resorting to additional complex equipment or additional "buttons" on the telephone handset itself, the transmission of such "alpha-numeric" data as well as "control" signals from a telephone handset to the computer was seemingly impossible. Unfortunately, the prior art has not advanced beyond this point and it has not been possible to achieve computer entry and manipulation of alpha as well as numeric data from a standard, unmodified "pushbutton" telephone.

Thus, there remains a need for the development of a simple and efficient technique and system wherein a "pushbutton" telephone handset can, without modification, be effectively utilized to transmit discrete signals to a computer device, said signals being representative of numeric data, alpha data and "-command" signals, the number of discrete signals transmitted far exceeding the number of "pushbuttons" on the telephone handset. It is the primary object of the instant invention to provide a system and technique which effects this desired operation.

Additional objects of the subject invention include:

a. the provision of a manipulation technique for the various buttons on a "pushbutton" telephone handset to effect a transmission of a plurality of discrete signal outputs far exceeding the number of "pushbuttons" provided on the telephone handset;

b. the provision of general translator systems and devices responsive to said plurality of discrete signal outputs generated by a "pushbutton" telephone handset to control the operation of any computer device; and, c. the provision of a specific translator system and device responsive to said plurality of discrete signal outputs generated by a "pushbutton" telephone handset to control the operation of a card punch.

The subject invention in a preferred embodiment thereof contemplates the interconnection of a translator system and device between (1) a standard "pushbutton" telephone handset and related telephone equipment and (2) a computer device, such as a card punch machine. A multiplicity of discrete output signals utilized for the transmission of alpha and numeric data as well as "command" information are developed from the standard "pushbotton" telephone handset by the utilization of a novel "twin-depression" button manipulation technique. Briefly stated, "control" or "command" signals are generated by simultaneously depressing or otherwise actuating two buttons on a "pushbutton" telephone handset, while alpha-numeric data information is transmitted by the depression or other actuation of a single "pushbutton." The signals thus transmitted selectively energize various circuits within a tone-to-digital converter or data set constructed in accordance with or similar to that of the Bell System Data Set 401J. The significance of the energization of the selected circuits within the data set is interpreted by a decoding device constituting one-half of a programmed translator unit, the decoding device providing a multiplicity of discrete output signals corresponding to the depression or actuation of various buttons singly or simultaneously together on the telephone handset. An encoding device constituting the other half of the programmed translating unit is connected between the multiplicity of discrete outputs from the decoding device and the particular computer or computer device desired to be controlled. The encoding device operates upon the plurality of discrete outputs from the decoder device to produce signals meaningful to the computer causing operation thereof. Thus, complete control over a remote computer can be achieved through utilization of existing telephone equipment, with the computer infeed of information data and commands being effected by a novel technique of manipulation of buttons upon a standard "pushbutton" telephone handset.

The invention will be better understood and its wide range of applicability in controlling the operation of computer devices will become clear when reference is given to the following detailed description of preferred embodiments thereof along with the accompanying drawings wherein:

FIG. 1 is a block diagram of the overall system operation using existing telephone lines;

FIG. 2 is a plan view of a standard "pushbutton" telephone keyboard including 10 buttons thereon;

FIG. 3 is a chart depicting the numerous possible discrete outputs available by manipulation of the buttons upon the keyboard of a "pushbutton" telephone handset in accordance with the invention;

FIG. 4 is a block diagram of the inventive system illustrating the production of a plurality of discrete signal outputs at a remote location through utilization of a tone-to-digital converter and an encoding device;

Figure 5:
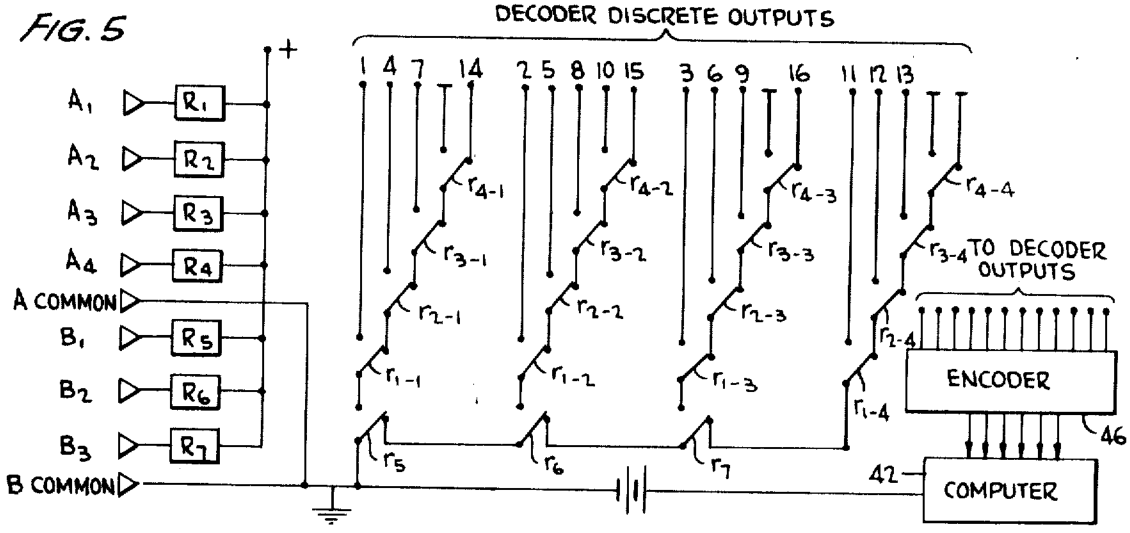
FIG. 5 is an electrical schematic depicting the operation of a simple exemplary decoding device constructed in accordance with the instant invention and the interconnection of the discrete outputs from said decoding device with an encoding device and a controlled computer mechanism associated therewith.
Figure 6:
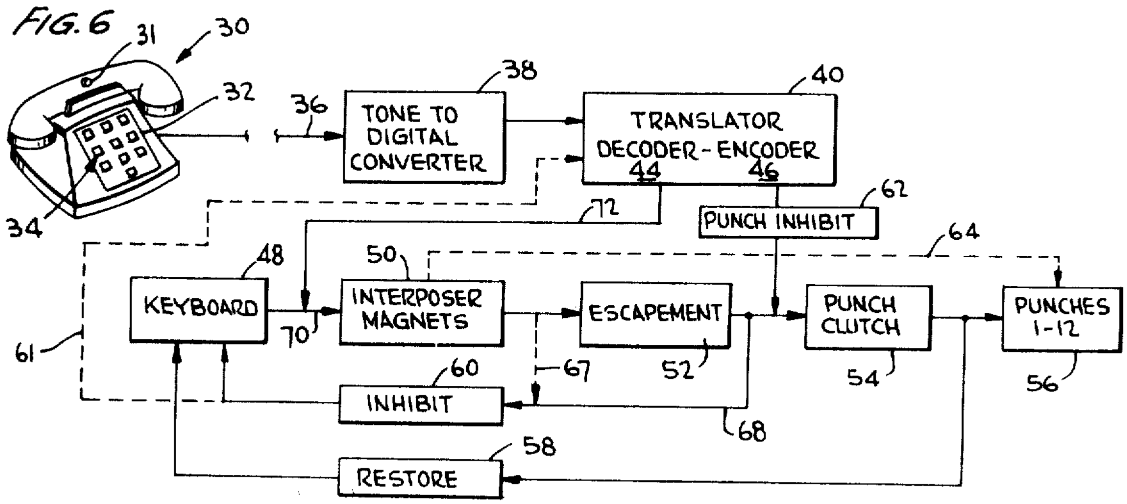
Figure 5A:
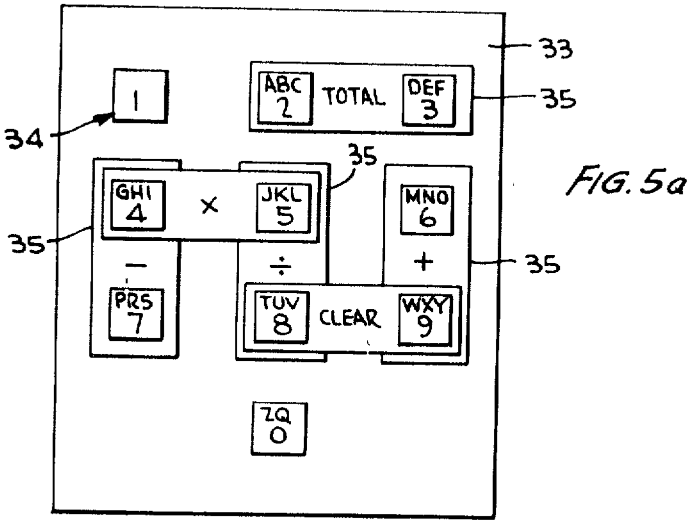
Figure 9:
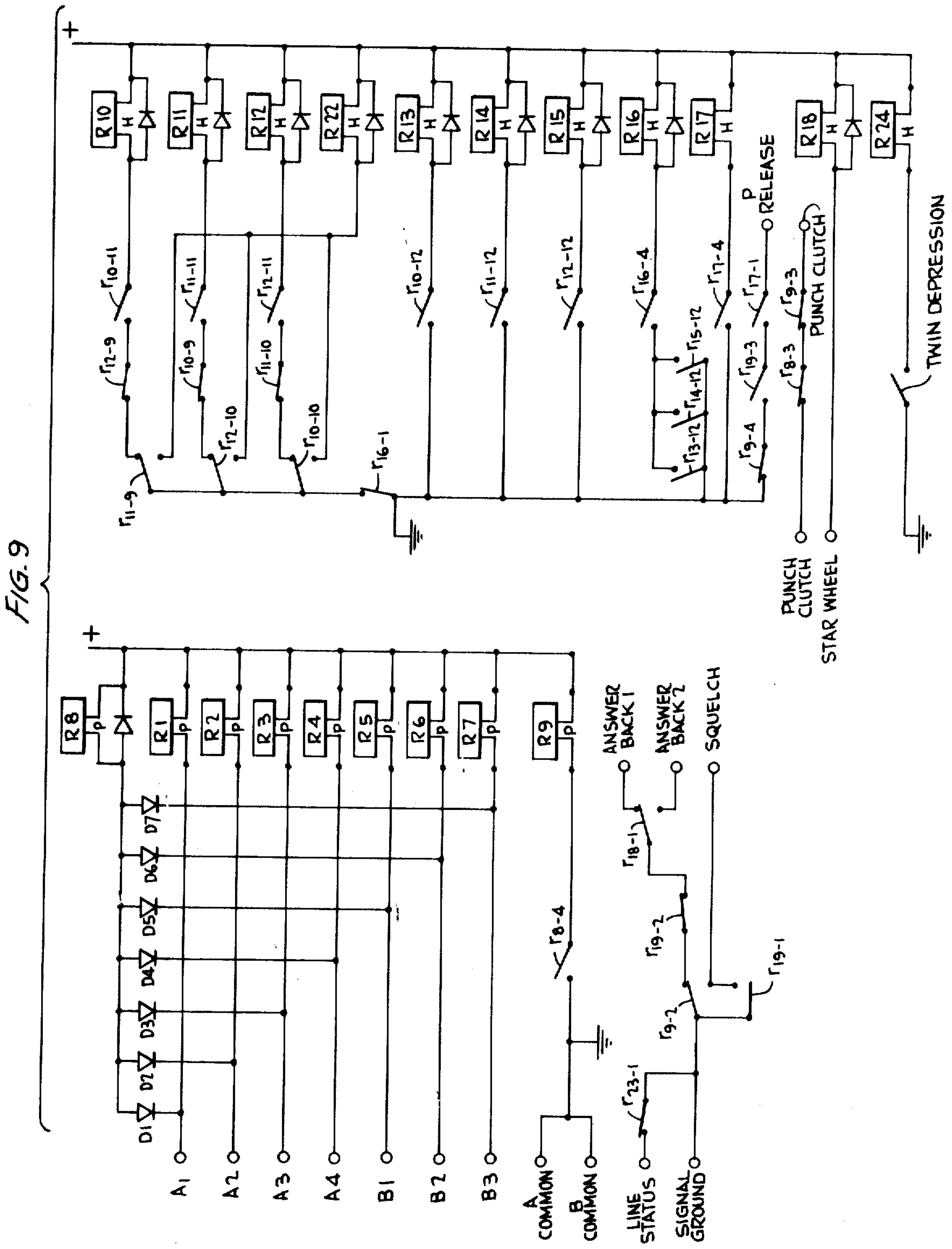
Figure 10:
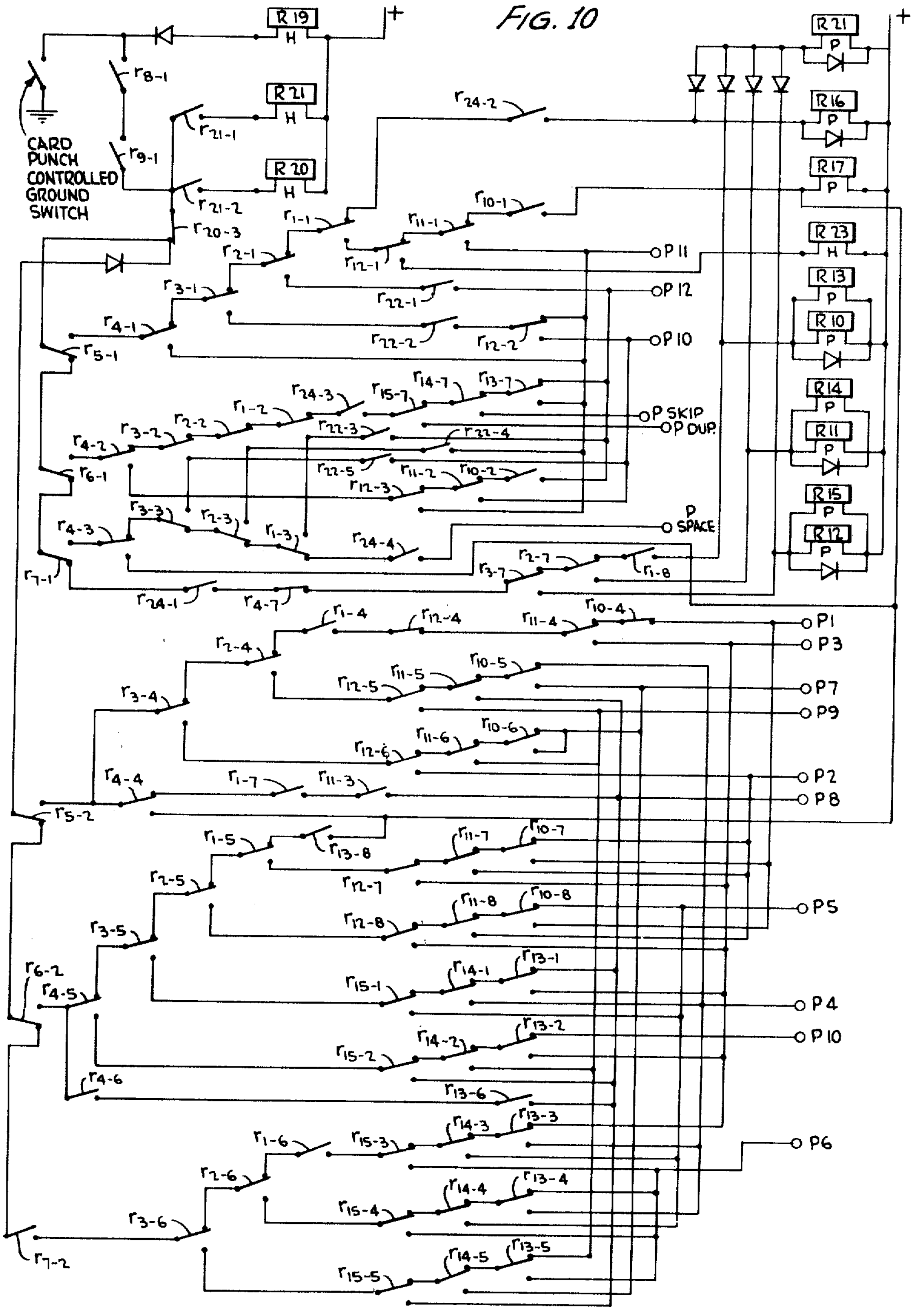

FIG. 5*a* is a plan view of a standard "pushbutton" telephone keyboard depicting the use of overlays thereon;

FIG. 6 is a functional block diagram of the operation of a typical card punch machine and the interconnection therewith of a "pushbutton" telephone handset and a translator system and device in accordance with the subject invention to effect automatic control;

FIG. 7 is a plan view of a typical data card showing the position of various holes punched therein by a card punch machine, said holes corresponding to various letters of the alphabet, numeric and other data;

FIG. 8 is a table or chart depicting a preferred coding arrangement of a programmed translator device constructed in accordance with the subject invention so as to produce discrete signals indicative of the various letters of the alphabet, the numerals of the decimal system, and a plurality of "commands" to effect operation of a card punch machine; and, FIGS. 9 and 10 are electrical circuit schematics of a preferred embodiment of a complete translator device constructed in accordance with the subject invention designed to automatically operate a card punch machine from a telephone handset.

GENERAL SYSTEM OPERATION

Referring now to FIG. 1, the overall operation of the subject inventive system is depicted. A standard "pushbutton" or so-called "touch-tone" telephone handset generally designated 30 is provided, the telephone handset preferably being of the construction generally set forth in U.S. Pat. Nos. 3,035,211, 3,076,059 and 3,184,554. However, rather than incorporating 16 buttons, it includes, as shown, 10 buttons designated 34. Still, the operation of the handset corresponds to that explained in the aforesaid patents. The telephone handset 30 is connected via an interconnection line 36 which may comprise existing telephone system transmission lines to a tone or digital converter 38. The tone or digital converter 38 may be a data set such as Bell System Model No. 401J. Depression or other actuation of various buttons 34 on the keyboard 32 of the telephone handset 30 produces discrete frequency tones over the interconnection line 36, these discrete frequency tones energizing and closing selected circuits within the tone-to-digital converter or data set 38. The output of the tone-to-digital converter 38 is fed to a translator device 40 which converts the selected circuit closings within the tone-to-digital converter 38 into meaningful control and data signals capable of completely controlling a computer mechanism 42.

TELEPHONE KEYBOARD AND SIGNAL DEVELOPING TECHNIQUE

The technique for developing a multiplicity of discrete control and data signals utilized for the transmission of characters of the alphabet, numeric and data control information from a telephone handset 30 can easily be understood by reference to FIG. 2. In the conventional "touch-tone" telephone, 10 buttons are normally provided. These buttons are arranged in four horizontal rows and three vertical rows, respectively. While this arrangement could be changed to 12 or 16 buttons, or even more sophisticated designs without departing from the scope and spirit of the present invention, it is helpful to consider the arrangement as now commonly used to facilitate an explanation of the invention and further, to demonstrate the manifest simplicity and applicability of the invention as to the production of a number of discrete information signals far exceeding the number of "pushbuttons" provided on the handset.

With the existing arrangement, the four horizontal rows of pushbuttons include 1 - 2 - 3, 4 - 5 - 6, 7 - 8 - 9, and 0, respectively. The three vertical rows include 1 - 4 - 7, 2 - 5 - 8 - 0, and 3 - 6 - 9, respectively. The buttons further include letters of the alphabet as shown. The operation of the keyboard 32 is such that for any button pushed or otherwise actuated in any horizontal row, a given frequency component appears on the output and similarly, for any button pushed or otherwise actuated in any vertical row, another given frequency component appears on the output. The frequencies developed can be considered to correspond to row numbers. For example, frequency component A1 represents the first horizontal row, A2 the second horizontal row, A3 the third horizontal row and A4 the fourth horizontal row. Frequency component B1 represents the first vertical row, B2 the second vertical row, and B3 the third vertical row. When pushbutton 1 is depressed, for example, frequency components A1 and B1 are simultaneously produced. This is the case as frequency component A1 appears in the first horizontal row, and frequency component B1 appears in the first vertical row, the intersection of the first horizontal row with the first vertical row "fixing" the position of pushbutton 1. In a similar fashion, when pushbutton 2 is depressed, frequency components A1 and B2 appear on the output since pushbutton 2 is in the first horizontal row but the second vertical row. Thus, there are two frequency components simultaneously produced at the output of the telephone handset 30 for any single depression of a given pushbutton number 0 through 9.

The subject invention makes use of the foregoing and further realizes the potential of producing differing signals than that above described in the event that two pushbuttons 34 are depressed simultaneously. While a multiplicity of differing frequency relationships and/or frequencies can be obtained depending on the number and arrangement of buttons that may be simultaneously depressed, simple computer control consistent herewith merely requires simultaneous depression or other actuation of two buttons. More particularly, it has been found that with the conventional touch-tone telephone handset, simultaneous depression of two buttons 34 in any given row causes but a single frequency component to appear at the output of the telephone handset 30. For example, if two pushbuttons corresponding respectively to the numerals 5 and 8 were simultaneously depressed, or otherwise actuated, only frequency component B2 would appear on the output of the telephone handset 30 and thus be transmitted along the interconnection line 36. Frequency components A2 and A3 would not be present. When two pushbuttons corresponding respectively to numerals 2 and 3 are simultaneously depressed, the frequency component A1 appears while frequency components B2 and B3 do not appear. Thus, the situation is such that with the utilization of existing telephone equipment, conventional operation of a "touch-tone" handset produces simultaneously two frequency components at the output representing the particular number of a single pushbutton depressed. Moreover, if any two buttons in the same row or column are simultaneously depressed, only one frequency appears at the output. The invention provides a technique which, as mentioned above, utilizes this capability to produce both command or control as well as data input signals to a computer.

It is of importance to realize that in accordance with the above description, any given piece of data whether it be alphabetical or numeric or in any language, and any given instruction or command signal can be represented by an instantaneous single output signal produced by the proper depression or other actuation of one or more of the pushbuttons existing on a standard pushbutton or "touch-tone" telephone handset. For instruction or command signals, the single output signal may consist of only one frequency component according to the above example whereas for a data input, the single output signal may consist of two frequency components which, while composite in nature, are instantaneous. Obviously, a "reverse" logic may also be used wherein a signal output of one frequency component represents data information and a signal output of two frequency components represents command information. This single signal technique permits a user of the system to perform only one operation for each piece of data and for each command to be given to a computer. Furthermore, this technique can yield a virtually unlimited number of single or multiple discrete output signals which can be produced merely by varying the number and particular button or buttons depressed or actuated.

Of further interest, and for more sophisticated units, this technique of generating command and data signals adapts itself to automatic devices for controlling the depression or actuation of a conventional "touch-tone" telephone set keyboard. Thus, the so-called "automatic dialing cards" and the techniques associated therewith can easily be utilized and, in fact, are so contemplated to be utilized with the instant invention. In this regard, the "automatic dialing cards" presently in use comprise a plastic card containing a plurality of holes punched therein, two holes being utilized for each signal output generation from the telephone handset corresponding to the simultaneous generation of frequency components selected from the "A" group and the "B" group discussed above. If only a single frequency component output was desired for any output signal, the "automatic dialing card" would have only one hole therein for the selected output corresponding to the generation of one frequency component from either the "A" group or the "B" group. An IBM data card and card reader could also be programmed to cause the telephone handset to generate the selected frequency components. It is for the above reasons that reference to the phrase "depress" a button or buttons on the telephone keyboard as utilized herein should be construed as encompassing both manual depression and automatic actuation of the selected buttons.

The above-described data and command signal input techniques from a telephone handset are preferably employed after normal dialing operations are carried out to first connect the telephone handset with a given remote location (particular telephone number) or interoffice communications code. The operator or user of the telephone would merely dial the computer as he would dial any other "outside" or "inside" number. Having established this particular telephone connection through the existent networks and switching matrix arrangements, further operation of the pushbuttons only results in producing "tones" on the line 36. The initial connection remains established until the telephone receiver is placed on the base of the handset 30 to effect a "hangup" operation. Accordingly, once the connection has been made, the user can operate the pushbuttons to feed data and commands to the computer without affecting in an adverse manner existent telephone equipment. The inventive system lends itself to time-sharing techniques since a single computer could be reached by any number of separate telephone handsets. A detailed description of the above-described data and command signal techniques utilizing a pushbutton telephone handset can be found by reference to copending U.S. application Ser. No. 487,391, filed Sept. 15, 1965, now Pat. No. 3,381,276, issued Apr. 30, 1968 and assigned to the assignee of the present invention.

A graphical representation of the number of different possible discrete signal outputs obtained through the above-described manipulation of the buttons on a 10-button "pushbutton" telephone handset can be found by referring to FIG. 3. Discrete outputs 1 through 10 are produced through normal operation of the pushbuttons 34. Single depressions of each of the buttons 1 through 0 on the telephone keyboard 32 produce, as described above, discrete outputs consisting of a simultaneous combination of two frequency components selected from groups A1 through A4 and B1 through B4 with one frequency component being selected from the A group and with the other frequency component being selected from the B group. However, additional discrete outputs numbered 11 through 16 corresponding respectively to single frequency output component A1, A2, A3, B1, B2 and B3 are produced by the simultaneous "twin-depression" technique of two buttons discussed above. It is to be noted that the single frequency component A1 providing discrete output 11 can be produced by the simultaneous depression of buttons 1 and 2, or 2 and 3, or 1 and 3 on the keyboard 32. In a similar manner, discrete output 12 corresponding to a single frequency component A2 can be produced by the simultaneous depression of buttons 4 and 5, or 5 and 6, or 4 and 6 on the telephone keyboard 32. The production of the remaining discrete outputs 13 through 16 is effected by simultaneous depression of the particular buttons indicated on the chart, and further discussion thereof is therefore unnecessary.

Accordingly, it is now possible while utilizing a standard 10-button, "pushbutton" telephone handset to produce 16 discrete signal outputs without resorting to modification of the telephone handset or to the addition of other complex components. As is evident, if the telephone handset were provided with 12 buttons, for example, the number of discrete outputs possible would increase to 19 through the above-described "twin-depression" technique. This is the case as it would be possible to obtain, in addition to the discrete frequency outputs depicted in FIG. 3, a 17th discrete output composed of frequency components A4 and B1, an 18th discrete frequency output composed of frequency components A4 and B3, and a 19th discrete output composed of single frequency component A4. These particular additional frequency components, of course, would be generated if the extra 11th and 12th buttons are respectively placed below the seventh and ninth buttons on the standard 10-button telephone keyboard 32, and in a horizontal line with the 0 button. Thus, the intersection of output lines B1 and A4 would define additional pushbutton 11, and the intersection of output component lines B3 and A4 would define the additional button 12. Accordingly, while utilizing the technique described above, the simultaneous depression of any two of the three buttons 11, 12 or 0 found in horizontal row A4 of the telephone keyboard 32 would produce the single frequency component A4.

Just providing the aforesaid technique wherein a conventional touch-tone telephone set is used in such manner that both data and instructions or commands are fed to a computer in the form of single signals represents in and of itself a significant advance in the art because it considerably simplifies operations at the user's end of the line without substantially complicating operations at the computer end of the line. Still, absent a further aspect hereof, the basic technique may require some experience on the part of the user in order to properly feed information to and instruct the computer since it is necessary for the user to properly assimilate the instructions to obtain the desired result from the computer.

The invention overcomes the necessity for experience, and thus renders computer control readily available to an average member of the public, by providing at least one, and if desired, a plurality of instructional command devices, preferably in the form of a card or sheet 33 such as depicted in FIG. 5A, adapted to be disposed in overlying relation to the keyboard on the base of a telephone set with the pushbuttons operatively extending therethrough. In particular, consistent with the invention, and for manual operations, the user preferably has an apertured card which he can place on the keyboard in operative associated with the pushbuttons so that the pushbuttons are exposed therethrough and available for normal operation. On such card, areas 35 overlapping two buttons are appropriately marked by color, indicia, or both, so that an operator immediately knows what two buttons to push simultaneously to effect any given command to a computer. For example, if the computer is programmed to perform an addition operation when the buttons 1-2 are depressed simultaneously (i.e., when frequency A2 only appears on the line consistent with the above example), then an area 35 or other indication on the card or overlay would immediately tell the user that for addition such two buttons are to be depressed. For subtraction, multiplication, division, etc., areas or indicia on the card would instruct the user which other groups of two buttons were to be depressed simultaneously. In other words, for manual operation, the invention provides an overlay which is adapted to be operatively associated with the keyboard on the conventional touch-tone telephone set to give a user an immediate and instantaneous visual instruction of the command which is to be fed to the computer to perform a given operation.

From the standpoint of end result desired, it is contemplated that at the computer end of the system, answering information corresponding to the result of the problem fed to the computer would be delivered to the telephone line and in turn to the user in audio form so that the user would secure a vocal answer to his problem. Even further, the computer system can produce any one of a virtually unlimited number of different outputs—e.g., a printed record, a vocal answer, a stored information bit or bits, etc., and combinations thereof, and/or if desired, a digital output or even visual display can be provided at the user's end.

While the form and type of output can be varied, the more significant aspect of the invention from the standpoint of the instant specification resides in the fact that the conventional touch-tone telephone set, as presently installed at the user's location is available for telephone communications just as it was so available for such communication initially, and as further available without modification for computer service. There is absolutely no detraction from the telephone set itself or the uses to which it can be put by the invention hereof. On the contrary, normal telephone operation is fully utilized for the purpose of connecting the user with a computer merely by "dialing" a number in the normal fashion. However, once a connection with the computer is established, the telephone set itself, without modification or variation, is utilized to both instruct the computer and feed data thereto. For manual operation, the user at most, is merely required to place an overlay in operative association with the keyboard so as to have computer commands instantly available by visual observation.

The invention itself, and in particular, the use of overlays, readily adapts the system for performance of a multiplicity of different types of operations. For example, one overlay and the instructions associated therewith can direct a given computer or computer device for the basic mathematical operations of addition, multiplication, subtraction and division. On the other hand, merely by providing another overlay, a user can direct a given computer or computer device to perform another series of functions related to virtually an unlimited number of processes such as bookkeeping, time records, games, purchasing, etc., printing, punching and the like.

GENERAL TONE-TO-DIGITAL CONVERTER AND DECODER

Referring now to FIG. 4, it must be kept in mind that single depressions of various ones of the buttons 0 through 9 on a telephone keyboard 32 serves to produce on the output of telephone transmission line 36 various combinations of frequency components generated simultaneously two at a time selected from groups A and B. In other words, depression of any one of the buttons 0 through 9 produces one frequency output component selected from the A group and another frequency component selected from the B group. Simultaneous or "twin-depression" of two or more buttons in a single row or column serves to produce only a single frequency component at the output, that is, a single frequency component selected from the group A or a single frequency component selected from the group B.

These frequency components are transmitted over the telephone interconnection or transmission line 36 and provide an input to a tone or digital converter 38 which, as described above, may be a standard telephone data set such as presently available from the Bell System. The tone-to-digital converter 38 serves to "interpret" the various frequencies coming in upon the telephone transmission line 36 and "converts" these various frequencies or tones into an actual digital output. Thus, if frequency components A1 and B1 were simultaneously present on telephone transmission line 36, these particular frequency components corresponding to the single depression of button 1 on a telephone keyboard 32, the tone-to-digital converter 38 would close an internal circuit connecting the data set output line A1 with the A common output line and connecting output line B1 with the B common output line. This particular internal circuit interconnection is depicted within the tone-to-digital converter 38 by the dotted lines. In a similar manner, however, frequency components A2 and B2 simultaneously produced by the single depression of pushbutton 5 on the telephone keyboard 32 would serve to close an internal circuit within the tone-to-digital converter 38 interconnecting output line A2 with the A common line and interconnecting output line B2 with the B common line. If the user of the telephone handset 30 depressed two buttons in a particular row or column in a simultaneous manner corresponding to the above-described technique, only one of the frequency components selected from either the B group or the A group would appear on the telephone interconnection line 36. Thus, for example, if buttons 7 and 8 were simultaneously depressed by the user of the telephone handset 30, frequency component A3 would be the only frequency component to appear on the interconnection line 36 thus causing an internal circuit closing within the tone-to-digital converter 38 effecting an interconnection only of output line A3 with the A common line.

Accordingly, through the simple connection of a standard pushbutton telephone handset 30 with a standard tone-to-digital converter or data set 38, a general system is provided which is capable of producing at the output of the tone-to-digital converter 38, selective closing of various ones of the line circuits in the A group with the A common line and/or various ones of the line circuits in the B group with the B common line. The only additional hardware needed to effect discrete control signals for a computer device is the provision of a simple decoder network 44 which serves to translate the various line circuit closings within the tone-to-digital converter 38 into a plurality of discrete outputs, these outputs being depicted in the graph of FIG. 3. Thus, decoder network 44 must function in a manner such that if the internal circuits between output conductors A1 and A common as well as output conductors B1 and B common were closed within the tone-to-digital converter 38, energization of discrete output number 1 of decoder 44 must be effected. Similarly, for example, if an internal circuit were completed within the tone-to-digital converter 38 only interconnecting output line conductor B1 with the B common conductor, the operation of the decoder 44 must be such as to energize discrete output number 14 thereof. The decoder unit 44 operates in a similar fashion to produce any one of the discrete outputs numbered 1 through 16 depending on the selective interconnection of various ones of the lines in the A group with the A common line and the lines in the B group with the B common line within the tone-to-digital converter 38, all in accordance with the graph of FIG. 3.

The tone-to-digital converter 38, in addition to providing a plurality of usable outputs corresponding to line groups A and B, provides a plurality of internal control outputs which serve the standard "answer-back," "squelch," and "data ready" functions that are common in the art. A detailed description of these particular internal control functions are not necessary at this point for an understanding of the present invention. The various interconnections necessary between the internal control output lines of the tone-to-digital converter or data set 38 with the illustrative decoder unit 14 as described or with any other desired piece of equipment is adequately set forth in the literature and reference is made to the Bell System Data Communications Technical Reference, Data Set 401J - Interface Specifications, Sept. 1965.

DECODER UNIT AND OPERATION

An exemplary schematic diagram of circuits suitable for use within the general decoder unit 44 and which operate according to the graph of FIG. 3 is shown in FIG. 5 of the drawings. There is depicted in the circuit schematic of FIG. 5, the various output lines or conductors A1 through A4, B1 through B3, A common and B common running from the tone-to-digital converter or data set 38. As was described with reference to the operation of the tone-to-digital converter 38, said tone-to-digital converter 38 serves to selectively interconnect various ones of the conductors A1 through A4 with the A common line and/or various ones of the conductors B1 through B3 with the B common line. Provided in each of the lines A1 through A4 and B1 through B3 of the decoder unit circuitry are a plurality of respective relay coils labeled R1 through R7. Relays R1 through R7 are respectively connected to the conductors or lines of group A and group B as depicted in FIG. 5. In accordance with the described operation of the tone-to-digital converter or data set 38, if an internal circuit connection within the tone-to-digital converter or data set 38 connected output conductor A1 with the A common line, for example, and, at the same time interconnected conductor B1 with the B common line, a complete circuit path with the illustrated decoder unit could be traced from the depicted source of potential through relay R1, through the internal circuit connection within the tone-to-digital converter interconnecting lines A1 with A common and then to ground. Thus, relay coil R1 would be energized. In a similar manner, another circuit path would also be completed from the source of potential, through relay coil R5, through the interconnected circuit within the tone-to-digital or data set 38 between lines B1 and B common, and then to ground. Thus, relay coil R5 also would be energized.

The selective energization of various ones of the relay coils R1 through R7 serves to actuate or switch associated relay contacts *r* in the illustrated logic-tree portion of the decoder circuitry. Within the logic-tree circuits, all relay contacts associated with relay coil R1 are depicted as $r_1$. Additionally, it is to be noted that a plurality of relay contacts *r* may be provided for each relay coil and it is for this reason that the many relay contacts $r_1$ as well as the respective relay contacts for the other relay coils also include a second numerical representation. Thus, relay contact $r_{1-1}$ corresponds to the "first" relay contact of relay coil R1, relay contact $r_{1-2}$ corresponds to the "second" relay contact of relay coil R1, and so forth. Within the actual logic-tree circuitry, all relay contacts "r" are depicted in the position which they assume when their respective relay coils R are nonenergized. As soon as the respective relay coils R are energized, however, the relay contacts *r* flip or are actuated to their alternative or "switched" position, opposite to that depicted in FIG. 5.

Continuing now with the description of operation, it was assumed in this instance, that relay coils R1 and R5 were energized, corresponding to an interconnection of lines A1 with A common and B1 with B common within the tone-to-digital converter or data set 38. Energization of relay coils R1 and R5 serve to switch their respective relay contacts $r_1$ and $r_5$ to the "switched" or alternative position than that shown in FIG. 5. In this particular example, switching of the relay contact $r_5$ serves to connect the particular logic-tree group providing the set of discrete outputs numbered 1, 4, 7, and 14 to the illustrated common "ground" conductor. All other logic-tree groups are, of course, then isolated from the "ground" conductor because of the switching action of relay contact $r_5$. Accordingly, energization of relay coil R5 serves to make a so-called "gross" selection of the outputs 1, 4, 7, and 14 from the 16 discrete outputs depicted as being possible through actuation of the various relay contacts in the logic-tree. Tracing the completed circuit further, it is evident that relay contact $r_{1-1}$ will also be switched. The switching of relay contact $r_{1-1}$ serves to select and interconnect only discrete output conductor 1 to the "ground" conductor, all other discrete output conductors 4, 7, and 14 being "isolated." Thus, energization of relay coils R1 and R5 has been shown to produce a discrete output only at output conductor 1 of the logic-tree section through selective actuation of relay contacts $r_{1-1}$ and $r_5$.

As another example of decoder circuit operation, energization of relay coil R2 in the circuit of FIG. 5 can be effected by an internal circuit closure between line conductors A2 and A common within the tone-to-digital converter or data set 38. When relay coil R2 is energized, all relay contacts $r_{2-1}$ through $r_{2-4}$ will be switched to their alternative position than that shown in FIG. 5. This switching of relay contacts *r2* serves to complete or close a circuit only between discrete output conductor 12 and the common "ground" line. Briefly referring again to the graph of FIG. 3, it can be ascertained that energization of discrete output conductor 12 corresponds to the presence of only frequency component A2. It should be apparent that each one of the various discrete outputs 1 through 16 can be selectively connected to the "ground" conductor by the presence of various ones of the frequency component outputs of group A and/or group B which, in turn, actuate or energize respective relay coils R1 through R7 within the decoder unit 44.

Considering the above description of decoder circuit operation, the overall general system operation as so far described is as follows. Assume, for example, that the user of the telephone handset 30 first "dials," in the standard manner, the particular telephone number which will interconnect telephone handset 30 along telephone transmission line 36 with a tone-to-digital converter or data set 38 provided at a remote location. Once this particular interconnection is made, the user of the telephone handset 30 will then depress the pushbuttons 34 upon the keyboard 32 in the above manner to provide data input signals as well as command or information signals through the tone-to-digital converter or data set 38 to a decoder unit 44 to selectively energize various ones of discrete decoder outputs 1 through 16. If desired, a voice-exclusion key 31 can be provided on the telephone handset to break the microphone circuit therein and eliminate all background noise. Alternatively, a sound shield cap 31*a* might be placed over the microphone portion of the existing handset to accomplish the same purpose.

An example of a sound shield cap suitable for the above purposes is found in FIG. 1, wherein an exemplary cap 31*a* which may be formed of plastic, is disclosed as comprising a lower base portion 31*b* and a skirt portion 31*c*, the skirt portion being dimensioned so as to frictionally fit over the microphone of the telephone handset 30. As is apparent, both the sound shield cap 31*a* or the voice-exclusion key 31 would, by their background noise elimination function, serve to greatly increase the system reliability, particularly in high noise locations such as airports, phone booths and the like.

Assuming that the user of the telephone handset 30, after correctly "dialing" or being interconnected with the tone-to-digital converter or data set 38, then simultaneously depressed pushbuttons 5 and 8 on the telephone handset 32, there will be produced upon the interconnection or transmission line 36 only the particular frequency output component B2 in the fashion described above. The tone-to-digital converter or data set 38, upon receipt of only the frequency component B2, will internally interconnect the data set output line B2 with the B common line. Interconnection of output line B2 with B common effects an energization of relay coil R6 within the decoder unit 44. In turn, energization of relay coil R6 then will actuate all relay contacts r6 within the logic-tree portion of the decoder circuitry. Actuation of relay contacts r6 serves to selectively connect only discrete decoder output conductor 15 with the ground conductor. All other discrete decoder output conductors are not selected. Thus, after normal "dialing" of the data set, a simultaneous depression of pushbuttons 5 and 8 upon the telephone keyboard 32, actuates decoder output 15. Turning again to the coding chart of FIG. 3, it can be easily verified that the "twin-depression" of buttons 5 and 8 was designed to produce a discrete frequency output B2 corresponding to a connection of discrete decoder output line 15. This particular decoder output 15, as well as all decoder outputs 11 through 16 produced by a simultaneous depression of two buttons on the telephone keyboard, can be considered to be "command" or information signals.

In a similar fashion to that described above, if the user of the telephone handset 30 depressed only one of the buttons such as button 4, for example, on the telephone keyboard 32, two frequency output components A2 and B1 would be generated upon the telephone interconnection or transmission line 36. The generation of these particular frequency components A2 and B1 serves to internally interconnect within the tone-to-digital or data set 38 output line A2 with A-common and output line B1 with B-common. This interconnection will energize relay coils R2 and R5 within the decoder unit 44. Energization of relay coils R2 and R5 will, in turn, switch their respective relay contacts r2 and r5 into their "switched" or alternate position. The switched selected relay contacts complete a circuit only between discrete decoder output line 4 and the ground conductor. All other discrete decoder output lines will not be connected to ground. Again referring to the coding chart of FIG. 3, this operation can be verified as it is apparent from the chart that depression of only button 4 on the telephone keyboard 32 serves to generate discrete frequency output components A2 and B1 which serve to select discrete decoder output line number 4 as described.

ENCODER UNIT AND OPERATION

As should be apparent, the ability to select only one of a plurality of 16 discrete outputs, for example, from merely a 10-button "pushbutton" or "touch-tone" telephone handset can be utilized to control a computer 42 of any desired variety. An encoder unit designated 46 would be connected between the computer 42 and the discrete decoder outputs of the decoder unit 44. The actual circuitry within the encoder unit 46 would be dictated by the needs of the particular computer device desired to be controlled. Assuming the computer device to be a card punch, the selection of discrete decoder output line 13 could be "interpreted" within the encoder unit 46 as calling for some particular "command" operation for computer device 42, this particular "command" corresponding to the "spacing" of a data card within the card punch. Similarly, energization of discrete decoder output line 5 might be "interpreted" and encoded by the encoder unit 46 such that the computer device 42 or card punch, for example, would "punch" and "print" a certain selected numerical character.

Of particular importance is the capability of the above-described system to effect the punching printing of any alpha or numeric data in a controlled computer device such as the card punch. For example, the encoder unit 46 could "interpret" the selection of discrete decoder output line 13 to be a "command" signal generally instructing the card punch to "punch" and/or "print" alpha data rather than numerical data. Then, the following energization of any one of a selected number of discrete decoder outputs would then effect "punching" and/or "printing" of selected characters of the alphabet. If the encoder device 46 then received another "command" signal, such as could be produced by energization of discrete decoder output 15, for example, the encoder unit 46 could cause the controlled card punch or computer 42 to "shift" into the "numeric mode" and thus, each successive energization or selection of selected discrete decoder output lines could be interpreted as a call for the "punching" and/or "printing" of selected numeric data once again. As is apparent, the number of different control environments and computer devices possible to be utilized in the above novel system is virtually unlimited and is not limited to merely a controlled card punch. Obviously, once a general decoder unit 44 constructed in accordance with the instant invention is interconnected with a standard data set, the user of the particular system would only have to insert a particular encoder unit 46 corresponding to the particular computer device 42 that was desired to be controlled. Accordingly, the subject invention broadly contemplates a system whereby a plurality of different encoder units corresponding to different computer devices are provided, a different encoder unit being inserted into the system by the user whenever desired. Such flexibility of operation is, of course, advantageous from an economic standpoint and inures directly from the capability of the subject invention to produce a plurality of discrete signals far exceeding the number of buttons on a telephone keyboard over standard and existing telephone networks.

PREFERRED TRANSLATOR FOR CARD PUNCH

A specific "programmed translator" unit embodying the above-discussed features and comprising a combined "decoder" and "encoder" effecting automatic control of an IBM card punch, for example, is illustrated in FIG. 6. A functional block diagram of the controlled computer device comprising a card punch is depicted and will first be described so as to obtain an understanding of the necessary connections with the exemplary translator unit. A keyboard arrangement designated 48 contains a plurality of punch keys corresponding to the various numerals 0 through 9 of the decimal system, the 26 letters of the Roman alphabet, and various card punch control function keys such as "space," "release," "duplicate," "skip," and the like. Depression of the one of the various keys upon the card punch keyboard 48 selectively energizes certain ones of a set of interposer magnets 50. If the particular key selected upon the keyboard 38 is such that it calls for an actual "printing" and/or "punching" operation, the energized interposer magnets 50 serve to "ready" or " set," along schematically illustrated dotted line conductor 64, one or more of the 12 punches in the punching mechanism 56. At the same time, however, the energized interposer magnets 50 would operate an "escapement" 52 which serves to advance a data card within the card punch machine one space. Either simultaneously with the energization of the interposer magnets or after the data card has been advanced one space, depending upon operational conditions, the output 67 of the interposer magnets or the output 68 of the "escapement" 52 produces an "inhibit" function signal 60 which locks or inhibits the keyboard 48 such that depression of any other buttons upon the keyboard 48 will have no effect until the last operation within the card punch cycle is completed. The output of the "escapement" 68 also energizes a punch clutch 54, the output 66 of which releases the selected "readied" or "set" punches 56 to effect a punching and also serves to "restore" the keyboard to normal operation via the restore block 58.

Thus, if the letter A, for example, was called for by depression of the corresponding key upon the card punch keyboard 48, the proper interposer magnets 50 would be energized which would, in turn, "ready" for final operation punches 1 and 12, for example, in the punch mechanism 56. At this same time, however, the energized interposer magnets would operate the "escapement" mechanism 52 advancing the data card one space and the keyboard would be "locked" or inhibited against any further operation until completion of the cycle. The punch clutch 54 would then be actuated thus releasing the "readied" punches 1 and 12 causing particular holes to be "punched" and letters to be printed on a data card and also effecting the restoration or release of the keyboard 48. If the particular key depressed upon the keyboard 48 merely called for a control function not requiring actuation of the punch mechanism 56, a similar operation of the card punch would result. The proper interposer magnets of the group 50 would be selected, the escapement mechanism 52 operated and the keyboard inhibited, the punch clutch actuated, and the keyboard "restored" during one cycle of operation. As is apparent, when a control function is called for rather than actual "printing" and "punching," the particular group of interposer magnets 50 selected do not cause a signal to be sent along dotted line conductor 64 to set any of the punches 56.

The preferred translator of the subject invention is depicted in FIG. 6 as functional block 40 and serves, in a conceptual manner, to bypass or shunt the card punch keyboard mechanism 48 and thus directly control the internal workings of the card punch mechanism. Thus, it is seen that a schematic conductor 72 leads from the translator device 40, comprising a combination of a decoder 44 and a suitable encoder 46, to the input 70 of the selectable interposer magnets 50. Such an interconnection, however, by itself is not suitable to ensure proper operation of the card punch mechanism. As discussed above, signals are generated internally within the card punch that serve to inhibit or "lock" the keyboard after depression of a selected key thereon. The keyboard is only "restored" after a particular desired function has been completed. Thus, only the initial depression of a key upon the punch keyboard 48 is effective to initiate a card punch cycle. Due to the action of the inhibiting mechanism 60 within the card punch, no deleterious effects could occur if the user of the card punch depressed a second key in quick succession with the depression of the first key upon the keyboard 48, or if the user of the card punch mechanism pressed a particular key and caused this key to remain depressed. In either case, due to the internal operation of the keyboard "inhibit" and "restore" mechanisms 60 and 58, respectively, a short impulse is produced by the initial depression of a key, without regard to how long this key is actually physically held depressed, and any further depression of keys upon the keypunch keyboard 48 will have no effect until completion of the first called-for cycle.

Accordingly, the card punch translator of the subject invention must make provisions for such a "interlocking" keyboard operation. This "interlocking" insures reliability of controlled card punch operation since, when the user thereof is utilizing the actual buttons 34 upon a standard "pushbutton" telephone keyboard 32 instead of the keys on the card punch keyboard 48, the operation of the telephone handset is such that as long as the particular selected pushbuttons are depressed, a signal will be impressed upon the line. As explained above, proper operation of the card punch requires the sending of only a single control pulse to initiate a cycle of operation. Thus, the translator is designed to function in such a manner that only the release of an initially depressed telephone pushbutton or buttons will serve to initiate the card punch cycle, continued depression of the selected pushbuttons upon the telephone keyboard 32 having virtually no effect upon the card punch until the buttons are actually released.

This "interlocking" function is suitable provided for as schematically represented by the punch "inhibit" 62 coming from the translator device 40 and the dotted inhibit conductor 61 leading to the translator device. The punch "inhibit" 62 is actuated whenever selected pushbuttons 34, corresponding functionally to the depression of keys upon the punch card keyboard 48, are depressed to halt the cycle of the card punch machine before actual operation of any selected punches 56. Only when the selected pushbuttons 34 on the telephone keyboard 32 are released will the punch "inhibit" mechanism 62 be removed, thus actuating the punch clutch 54 and the punches 56 to complete the card punch cycle. The dotted inhibit conductor 61 serves to sense the presence of an internal inhibit function within the card punch and effectively isolates the translator 40 from any further key depression until the completion of the card punch cycle. Thus, in a very novel manner, the translator mechanism of the subject invention not only eliminates the function of the keyboard 48 within the card punch or computer device itself, but also serves to provide the same internal keyboard "interlock" or inhibiting function generated within the card punch. The actual details of this inhibiting operation as well as an exemplary circuit schematic of the translator unit 40 designed specifically for card punch control is discussed below.

PUNCH CODING OF DATA CARD

It is helpful at this point to first ascertain the nature of the actual punch "coding" of the card punch mechanism by reference to FIG. 7, wherein there is depicted a typical data card with the various letters of the alphabet, the various numerals of the decimal system, and other characters both printed and punched thereon. As discussed with reference to FIG. 6, a card punch mechanism utilizes for its printing and punching function 12 punches 56. Each of these 12 punches, when actuated, serves to punch a hole at a specified location upon the data card. The data card itself can be construed as comprising a plurality of vertical columns, each column containing 12 hole locations corresponding to each of the punches 1 through 12 within the punching mechanism 56 of the card punch. From the top to the bottom of the depicted data card, the various positions within each column are represented by punches 12, 11, 0, and 1 through 9 in that order. As is shown, if printing of the letter A is desired, interposer magnets 50 and punches 56 corresponding to the actual operation of punch 12 and punch 1 would be actuated. Holes would appear in the column marked 12 and in the column marked 1. Thus, a data card having positions 12 and 1 punched in the same column, would cause a card reader or other conventional device to register or print the letter A. In a similar fashion, if it was desired to print the letter S, then punch 0 and punch 2 would be actuated causing holes to appear in positions 0 and 2 in one column of the data card. It is to be noted that the actual printing of any of the decimal numerals 0 through 9 is effected by causing one of the respective punches 0 through 9 to be actuated alone. Thus, when numeric data is printed upon a data card, only one punch corresponding to the numeral desired is caused to be actuated.

Each of the letters in the alphabet from A through I require the simultaneous actuation of punch 12 along with one other punch selectively actuated from the group of punches 1 through 9. The printing of any character in the alphabet from J through R requires the simultaneous actuation of punch 11 along with one of the other punches selected from the group 1 through 9. Similarly, the printing of any character of the alphabet in the group S through Z requires simultaneous actuation of the punch 0 along with one of the other punches 2 through 9, in this case. Printing of any of the numerals 0 through 9, however, requires the actuation of only one of the punches selected from the group 0 through 9. Obviously, other indicia can also be printed and punched upon a data card such as the "&" character, a "—" sign, a "$" sign, a "." and the like, each character corresponding to actuation of various ones or pairs of the punches 0 through 12.

GENERAL CODING OF CARD PUNCH TRANSLATOR

From the above description of the "coding" on a standard data card, the function of the encoder portion 46 of the translator 40 is immediately apparent. When the user of a telephone handset 30 desires to cause a card punch to print the letter A, the translator device 40 and particularly the encoding portion thereof must function in a manner such that the actual card punch cycle is initiated, punches 12 and 1 within the punching mechanism 56 are "set," the "escapement" mechanism 52 operated, and, finally, the punch clutch 54 released to actually cause punches 12 and 1 to be actuated and the internal cycle completed within the card punch machine. In a similar manner, selection of any other character, whether it be alphabetical or numeric, upon the keyboard 32 of a telephone handset must initiate a card cycle within the card punch machine and actuate the proper one or pairs of punches 1 through 12 of the actual punching mechanism 56 as indicated in FIG. 7.

PREFERRED TRANSLATOR CODING TECHNIQUE

A number of different coding possibilities are contemplated which will cause translator device 40 coupled with a "pushbutton" telephone handset 30 to operate in the above-described manner. For example, and referring again to FIG. 2 of the drawings, if the user of the telephone handset 30 desired a card punch to print the character of the alphabet appearing in the first position upon the respective buttons 2 through 9, that is characters in the group A, D, G, J, M, P, T, or W, he would simultaneously depress two of the various buttons 34 in a particular row or column upon the telephone keyboard 32. Such simultaneous depression, as discussed above, would generate one of the frequency output components selected from either the group A or the group B, the appearance of only one component representing a "command" or instruction signal calling for the translator device 40 to "shift" into an Alpha 1 mode, for example. After this "shifting" operation were done, the user of the telephone handset 30 would then depress any one of the respective buttons 2 through 9 as desired. However, since the translator device 40 had previously been placed or "shifted" into an Alpha 1 mode, the occurrence of frequency output components A1 and B2, for example, produced when the button 2 was depressed, would not cause the translator device 40 to "read" the signals as numeral 2, but rather would cause the translator device 40 to "read" this incoming signal as calling for the letter A. Likewise, if the translator device 40 were "shifted" into an Alpha 2 mode by a selected simultaneous "twin-depression" of two buttons in a row or column, the translator device 40 would "read" the next set of frequency components as representing selected ones of the letters of the alphabet in the second position upon the various pushbuttons 34. In other words, once the translator device 40 was placed into an Alpha 2 mode, all signals following the "command" signal to "shift" into this mode would be interpreted as selectively calling for the characters of the alphabet B, E, H, K, N, R, U, X, and Z, corresponding to depression of one of the buttons 2 through 0. Various other "shift" modes of operation would, of course, be similarly provided such as Alpha 3, Numeric, etc.

This particular operational function of translator 40 can be more easily understood by reference to FIG. 8 of the drawings wherein the above-described keying of a telephone handset 30 to cause a translator 40 to operate a card punch is depicted. As is shown in FIG. 8, if the alpha character A was desired to be "punched" and/or "printed" on a data card within a card punch, the translator 40 would first be caused to "shift" into the Alpha 1 mode by a simultaneous "twin-depression" of pushbuttons 2 and 3 upon a telephone handset 30. Once the translator 40 is shifted into the Alpha 1 mode, the operator of the telephone handset 30 would then depress only pushbutton 2 (letter A in the first position) thereon. The translator device 40 would then actuate punches 12 and 1, corresponding to the letter A on a data card as discussed in FIG. 7, to complete the punching and printing of the desired letter A. It is to be understood that the translator device 40, when once placed into an Alpha 1, an Alpha 2, an Alpha 3, or a Numeric mode, for example, would remain in this particular chosen mode until another specific control or "command" signal calling for a change or "shifting" of modes is received. Thus, for example, once translator device 40 is placed in the Alpha 1 mode by simultaneous, "twin-depression" of buttons 2 and 3 upon the telephone keyboard 32, the translator would remain in this mode until a further "twin-depression" of buttons takes place since each successive depression of only a single button would represent data or information as opposed to control or instruction commands. The card punch would then punch and print only the characters included within the selected Alpha 1 mode.

As in evident from an inspection of FIG. 8, buttons 5 and 6 would have to simultaneously depressed upon the telephone keyboard 32 to cause translator device 40 to shift into an Alpha 2 mode. Similarly, buttons 8 and 9 would have to be simultaneously depressed upon the telephone keyboard 32 to cause a translator device to shift into an Alpha 3 mode. In a similar fashion, buttons 4 and 7 upon the telephone keyboard would have to be simultaneously depressed to cause the translator device 40 to interpret all succeeding single depressions of buttons as calling for a certain character to be selected from the Numeric mode of operation.

With a coding technique as above-described, the number of separate control and data signals produced by the particular translator unit of the subject invention is far greater than the merely 16 discrete outputs or "functions" such as discussed with reference to the simple exemplary decoding unit of FIG. 5. In effect, the preferred card punch translator device 40, although basically comprising a functional makeup similar to the simple decoder and block encoder of FIG. 5, can be thought of as taking each of the 16 discrete decoder outputs and causing these discrete outputs to operate further logic-tree sections, which, in fact, comprise the block encoder device designated 46. Accordingly, the card punch translator 40 is capable of delivering to a card punch, or other computer mechanisms, a plurality of separate control and data signals, each signal being different from all others, and each signal being specifically designed to serve a particular function within the controlled computer device. Thus, with reference again being made to FIG. 8, the translator device 40 is capable of interpreting manipulation of various buttons on a telephone keyboard and delivering discrete control signals corresponding to all 26 letters of the alphabet, 10 decimal numerals, a "-space" information command, an "error release" information command, a "manual skip" and a "manual duplicate" command, a "period" command, a "release and feed" command, a "dollar" sign, an "end of transmission" connotation, and any variety of other individual commands characteristic of any desired function to cause a card punch to operate in accordance therewith.

ALTERNATIVE TRANSLATOR CODING TECHNIQUE

The above-described coding technique, although actually preferred and utilized with the specific translator device 40 disclosed in FIGS. 9 and 10 to be discussed below, should not be thought of as being restrictive but is merely exemplary in nature. An alternative technique and/or method of sending complete "alpha-numeric" data from a standard 10-button "-pushbutton" or "touch-tone" telephone handset is likewise contemplated. Instead of providing a translator device 40 which is responsive to separate Alpha 1, Alpha 2, Alpha 3, and Numeric shift commands in accordance with the graphical chart of FIG. 8, it is possible to merely provide one Alpha shift command serving to shift a translator device from a "numeric" into an "alpha" mode. Once this singular Alpha command was given, the translator device 40 would "interpret" all succeeding signals, until a Numberic command was given, as calling for characters of the alphabet and would cause a card punch or other computer mechanism to function in accordance therewith. For example, the user of a telephone handset 30 could simultaneously depress two buttons in a particular row or column or depress the 11th or 12th button if so provided which would indicate to and "shift" the translator device 40 such that following or succeeding data is interpreted in the Alpha mode. After this shifting was accomplished, the individual characters of the alphabet could be sent along the transmission or interconnection line 36 to the translator 40 in the following manner. Referring again to FIG. 2, it is to be noted that the letters of the alphabet are divided into various groups of three characters provided on each of the buttons 2 through 9, with letters Z and Q being conceptually depicted as being provided on button 0. In the first-mentioned coding technique described above, if the user of the telephone handset 30 desired to cause the alphabetical character K to be printed, he would first have to shift the translator device 40 into an Alpha 2 mode since the letter K is in a conceptual "-second" position upon its respective pushbutton 5. The user would then cause to be depressed pushbutton 5 which would complete the operation within the translator and cause a card punch to actually print and punch the letter K.

With the alternative technique, however, the user would merely have to shift the translator into a single Alpha mode and then, since the letter K is in a "second" position within its group JKL, the button 5 respectively provided for the group JKL would then be depressed calling for the group JKL and button 2 would be successively depressed to select the letter K from the 2 position in its group. In a similar manner, if the letter V of the alphabet was desired to be printed and punched, the user of the telephone handset 30, when the system functions in this alternative manner, would cause the translator device 40 to be shifted into the single Alpha mode by a simultaneous "twin-depression" of a selected two of the pushbuttons on 10-button "touch-tone" phones or by use of the 11th or 12th buttons on 12-button "touch-tone" phones, and then would depress pushbutton 8 calling for the TUV group and finally pushbutton 3 calling for the "third" position or placement of the letter V within its group TUV on the button. Of course, when operating in this alternative fashion, the translator device must be programmed to recognize that every two single depressions represents merely one letter of the alphabet. Command or instruction signals other than an Alpha shift could easily be effected by simultaneous "twin-depression" of two further buttons upon the telephone keyboard 32.

GENERAL CIRCUIT CONFIGURATION OF PREFERRED TRANSLATOR

Referring now to FIGS. 9 and 10 of the drawings, a complete translator device designed to be placed between a tone-to-digital converter or data set 38 and a card punch is illustrated. The input to the translator device is depicted in FIG. 9 as comprising conductors A1 through A4, B1 through B3, A-common and B-common and other internal control interconnections as discussed with reference to FIGS. 4 and 5 above. The interconnection of one of the conductor groups A1 through A4 with the A-common conductor causes energization of a selected one of relay coils R1, R2, R3, and R4. The interconnection of one of conductors B1 through B3 with the B common conductor causes energization of one of the relay coils R5, R6 or R7. As will be noted, this portion of FIG. 9 and the operation thereof is quite similar to that of the schematically illustrated decoder of FIG. 5. In addition to relay coils 1 through 7 as described, relay coil 8 and relay coil 9 are respectively provided. Relay coil R8 is connected in parallel, by virtue of diodes D1 through D7, with each of the relay coils R1 through R7. Additionally, relay coil R9 is connected between the source of power and relay contact $r_{8-4}$ (normally open). The actual function of relay coils 8 and 9 will be described in detail below but it will suffice to state, at this point, that relay coils R8 and R9 serve the punch clutch "inhibit" function as discussed with reference to FIG. 6.

The internal control interconnections discussed above are depicted as comprising conductors having endings labeled "line status," "signal ground," "answerback 1," "answerback 2," and "squelch" corresponding to the general "control" lines of FIG. 4 running from the data set. Various relay contacts $r_{9-2}$, $r_{18-1}$, $r_{19-1}$, $r_{19-2}$, and $r_{23-1}$ of the translator are disposed in the conductors, the operations of which are controlled by the respective relay coils in FIGS. 9 and 10 as will be apparent to effect certain functions as follows. A constant tone of a low audio frequency aNd a short tone of said low audio frequency are selectively generated by "answerback 1" within the data set to respectively indicate that the card punch machine is not ready for new operation commands since it is already in operation by previous commands ("busy signal") and that the card punch machine has responded to the present command. Accordingly, the user of the system would hear a short "beep" after each signal generation if all were in order and a long continuous tone if the card punch was already in operation or "busy."

A short, higher tone is generated by "answer back 2," when the data card within the card punch machine reaches a certain punch column or position as determined by the star wheel riding upon the data card and controlling the energization of relay coil R18. This tone is a "flag" indicating to the user of the system the data card position. Lastly, when a complete circuit path extends between the "signal ground" and "squelch" endings, the data set is constrained to operate as a receiver of incoming frequency signals.

FIG. 9 further schematically depicts a portion of the inventive translator unit which serves to "shift" the internal logic-tree circuits of the translator unit into the respective Alpha 1, Alpha 2, Alpha 3, and Numeric modes as discussed above. Relay coils R11 through R18, and R22 found in this portion of the translator circuitry are "holding" relay coils, the significance of which will become apparent. It is to be noted that a "twin-depression" function switch is provided in series with relay coil R24 between the source of supply and ground. Whenever the "twin-depression" switch is in a closed position, relay coil R24 is energized closing its respective contacts $r_{24}$ and causing the translator device as a whole to be responsive to input signals received along conductor groups A and B produced by a simultaneous or "twin-depression" of two buttons or keys upon the telephone handset keyboard 32. When the "twin-depression" switch is open, relay coil R24 is not actuated and the translator device is merely responsive to a single depression of the various buttons 34 upon the keyboard of a telephone handset 32. Thus, the inclusion of the "twin-depression" switch along with its associated novel circuitry provides a translator device that serves a dual function depending on its required use, one function corresponding to the "twin-depression" technique discussed, the other function corresponding to simple singular depressions of the pushbuttons upon a telephone keyboard.

The operation of the circuitry of FIG. 9 providing the translator "shift" function is such that the various ones of the "-holding" relay coils R10 through R17 and R22 will be energized only when selected ones of the relay contacts $r_{11}$, $r_{12}$, $r_{10}$, $r_{13}$, $r_{14}$, $r_{15}$, $r_{16}$, $r_{17}$, etc., are initially actuated by their associated "pulse" relay coils so as to switch from their illustrated position to their alternative or actuated position. A plurality of "pulse" relays corresponding to "holding" relays R10 through R17 and R22 are provided in other portions (FIG. 10) of the novel circuitry to be discussed, and serve to initially close the various contacts just described. Once these contacts are closed, the "holding" relay coils R10 through R17 and R22, function to keep their respective relay contacts $r$ as described in the energized or alternative position causing the translator to remain in a selected shifted state. It will be noted that the programmed translator will be in an Alpha 1 mode when relay coils R10 and R13 are energized; an Alpha 2 mode when relay coils R11 and R14 are energized; an Alpha 3 mode when relay coils R12 and R15 are energized; and a Numeric mode when none of these relay coils are energized.

Lastly, it is to be noted in FIG. 9 that a conductor having endings labeled "punch clutch-punch clutch" is provided, the conductor being broken at two series locations by relay contacts $r_{8\text{-}3}$ and $r_{9\text{-}3}$. When these relay contacts are in their energized or switched state, the conductor opens the path between both ends thereof. Accordingly, the punch clutch 54 within the card punch of FIG. 6 will be "inhibited" as discussed and cannot be actuated as long as the open circuit exists. Punch clutch 54 will be actuated when both relay contacts $r_{8\text{-}3}$ and $r_{9\text{-}3}$ are in their normal or, in this case, closed condition.

Referring now to FIG. 10, various relay contacts $r_1$ through $r_{25}$ along with relay coils to be discussed are depicted, the circuitry being similar to the logic-tree circuitry of the decoder and encoder units of FIG. 5. The particular logic-tree circuitry disclosed herein culminates in discrete outputs P1 through P12, these outputs corresponding to and operating the 12 punches found in the punch mechanism 56 of the card punch of FIG. 6. In addition to these outputs P1 through P12, the inventive circuitry provides an output labeled P-skip, P-dup, P-space, and, referring again to FIG. 9, P-release. These latter outputs provide the "control" functions inherent and necessary to the operation of an automatic card punch mechanism. The connection of the various outputs P1 through P12 along with the outputs P-skip, P-dup, P-space, and P-release to the card punch is achieved in a manner schematically depicted in FIG. 6 by conductor 72. As is apparent, each of the above discrete output conductors are suitably interconnected between the keyboard 48 of the card punch and the various interposer magnets 50 in a manner such that the function of the keyboard 48 is electrically duplicated.

Of particular importance within the general configuration of the relay logic-tree circuitry of FIG. 10 is the inclusion of a "card punch controlled ground switch" connected in series with relay coil R19 between a source of supply and ground. The "card punch controlled ground switch" assists in the punch clutch "inhibit" function above-discussed and provides a "timed" grounding function representative of the internal condition within the card punch unit itself. Specifically, one end of relay coil R19 is connected to ground through the "card punch controlled ground switch" when the card punch unit has completed an internal punching or control cycle and is ready to initiate another cycle. If, however, the card punch mechanism is in the middle of a punching cycle, then the "card punch controlled ground switch" will be open thus deenergizing relay coil R19 and, in fact, breaking the ground connection for the entire logic-tree circuitry of FIG. 10. Such a timed card punch controlled ground switch is inherently provided within any standard card punch mechanism by what is known in the art as a "keyboard bail contact" within the card punch. The general function of the logic-tree circuitry of FIG. 10 is such that it selectively connects one or more of the various outputs P1 through P12, P-skip, P-dup, P-space and P-release to ground through the "card punch controlled ground switch." All other nonselected outputs will be left "floating," that is not connected to ground and accordingly not effective to operate any one of the punch mechanism etc., within the card punch unit.

A specific description of the placement of all the various relay contacts and coils in FIGS. 9 and 10 is, of course, not necessary as this should be readily apparent by reference to these respective Figures. However, the operation of the various relays and relay contacts in relation to the functions they perform within the card punch and in relation to the selective depression of certain buttons 34 upon a keyboard 32 of a telephone handset 30 is informative and will be described so that one skilled in the art can obtain a better understanding of the inventive concepts therein.

OPERATION OF TRANSLATOR SYSTEM

As discussed above, the programmed translator unit of FIGS. 9 and 10 can be shifted into an Alpha 1 mode, an Alpha 2 mode, an Alpha 3 mode, and A numeric mode and, when in each of these particular modes, the translator is operative to selectively interconnect various ones of the outputs P1 through P12 and the "control" outputs P to ground to thus effect an actuation of proper interposer magnets 50 within the card punch unit and thus cause the card punch machine to operate in its normal manner to print and punch, as desired.

Initially, to facilitate an understanding of the operation thereof, it is assumed that the translator device of FIGS. 9 and 10 is in its "Numeric" shift mode. The user of the system would then initiate operation of the system as a whole by "dialing," in a normal fashion from his telephone handset 30, the particular number associated with the tone-to-digital converter or data set 38. When a connection was established along the schematically illustrated telephone interconnection or transmission line 36, the voice-exclusion key 31 could be actuated if desired, and the data set 38 will operate the programmed translator unit 40 in a manner corresponding to its internal coded circuitry and in response to single depressions or simultaneous "twin-depressions" of various buttons 34 upon the telephone keyboard 32. Assume, now, for example, that all is in readiness and that the operator of the system desires to cause the controlled card punch to print one of the characters of the alphabet within the group A D G J M P T or W. A quick reference to the graph or chart of FIG. 8 discloses that each of these letters above mentioned initially require the translator device 40 to be in the Alpha 1 mode. Accordingly, the user of the system would have to shift the translator device 40 into this selected mode. To accomplish this shift, the operation would be as follows:

ALPHA 1 SHIFT OF TRANSLATOR

Referring again to the chart or graph within FIG. 8, it is noted that an Alpha 1 shift is accomplished by the twin or "simultaneous" depression buttons 2 and 3 upon the keyboard 32 of the telephone handset 30. Referring now to FIG. 2, it is seen that the simultaneous depression of buttons 2 and 3 cause only the output frequency component A1 to be generated, since pushbuttons 2 and 3 both lie within the A1 horizontal row. As discussed above, output frequency components B2 and B3 will not be generated. Thus, frequency component A1 is transmitted over the telephone transmission or interconnection line 36 to the tone-to-digital converter or data set 38.

Referring now to FIG. 4, when only the frequency component A1 is impressed upon the tone-to-digital converter 38, the tone-to-digital converter or data set 38 effects an internal interconnection between the output conductor A1 and A common. None of the other output conductors either in the A-group or in the B-group are affected and these conductors, in fact, remain open. Accordingly, the user of the telephone by calling for the Alpha 1 shift by pushing simultaneously buttons 2 and 3 has initially caused a circuit to be completed between the output conductors or lines A1 and A common only.

Referring now to FIG. 9, a completion of a circuit between conductors or lines A1 and A common effects the energization of relay coils R1, R8, and, by virtue of the closing of relay contact $r_{8\text{-}4}$, also relay coil R9. As above-described, energization of relay coils R8 and R9 will switch relay contacts $r_{8\text{-}3}$ and $r_{9\text{-}3}$ amongst others, the switching of these relay contacts serving to open the punch clutch conductor of FIG. 9 and thus serve the punch "inhibit" function 62 to inhibit operation of the punch clutch 54 as depicted in FIG. 6. Energization of the relay coil R1, of course, serves to switch all relay contacts labeled $r_1$ from their shown or "nonenergized" position depicted in FIGS. 9 and 10 to their alternative or "switched" positions.

Beginning now from the "card punch controlled ground switch" constituting the ground or zero potential connection to the relay logic-tree circuit of FIG. 10, it is to be noted that relay coil R19 is connected from the positive supply of voltage to ground through the "card punch controlled ground switch." Energization of relay coil R19 switches relay contact $r_{19\text{-}1}$ within the control circuits between the data set 38 and the translator 40 depicted in FIG. 9. The switching of relay contact $r_{19-1}$ along with relay contact $r_{9-2}$ also effectively connects the conductor labeled "signal ground" to "squelch" within the tone-to-digital converter or data set 38.

Referring again to FIG. 10, closure of the relay contacts $r_{8-1}$ and $r_{9-1}$ completes a path from ground through the "card punch controlled ground switch" through nonenergized relay contact $r_{20-3}$, through nonenergized relay contact $r_{5-1}$, through nonenergized relay contact $r_{6-1}$, through nonenergized relay contact $r_{7-1}$ to relay contact $r_{24-1}$. Relay contact $r_{24-1}$, however, is switched to its energized or closed position by virtue of the closure of the "twin-depression" switch of FIG. 9 which, as described, caused relay coil R24 to become energized. The described circuit running from ground continues through the nonswitched relay contact $r_{4-7}$, through $r_{3-7}$, $r_{2-7}$, the switched position of $r_{1-8}$, to relay coils R10 and R13 and then to the positive side of the voltage source. Accordingly, the above-described circuit path serves to energize relay pulse coils R10 and R13, these relay coils corresponding to an Alpha 1 shift in the following manner.

Referring again to FIG. 9, energization of the pulse relay coils R10 and R13, of FIG. 10, causes switching of all the relay contacts $r_{10}$ and $r_{13}$. Accordingly, by virtue of the switching of these relay contacts, a path is completed from the source of supply through the relay contact $r_{10-11}$, through $r_{12-9}$, $r_{11-9}$, $r_{16-1}$, to ground, to energize the holding relay coil R10, in known manner. Holding relay coil R10 maintains all relay contacts $r_{10}$ in the energized or switched positions until such time as the circuit path between the voltage source through relay holding coil R10 and ground is broken. In a similar manner, closure of the relay contact $r_{10-12}$ completes a circuit from the source of supply through the relay holding coil R13 which serves, in known fashion, to maintain all relay contacts $r_{13}$ in a switched or energized position until the holding relay coil R13 circuit is broken. As is apparent, the immediate effect of the user of the telephone handset 30 simultaneously depressing buttons 2 and 3 on the keyboard thereof is to cause the energization of relay coils R10 and R13 and, consequently, the closure or switching of all relay contacts labeled $r_{10}$ and $r_{13}$. When the keys upon the telephone keyboard 32 are released, all relay contacts $r$ with the exception of $r_{10}$ and $r_{13}$ maintained by their respective holding coils R10 and R13, will again revert back to their nonenergized position. The translator device of the subject invention is now in the Alpha 1 mode.

CHARACTER PRINTING OPERATION

Once the translator is in the Alpha 1 mode, all further single depressions of the pushbuttons upon the telephone keyboard 32 will be interpreted as calling for some character within the Alpha 1 mode in accordance with the chart of FIG. 8. The translator device 40 will remain in the Alpha 1 mode until such time as a new "command" or control signal is generated from the telephone handset 30 by the selective simultaneous depression of two pushbuttons corresponding to the Alpha 2 shift, the Alpha 3, or back to the Numeric mode.

It is not necessary for an understanding of the subject invention to follow the circuitry that would be completed upon actuation of all the various possible pushbuttons on the telephone handset 30 while the translator device 40 is in the Alpha 1 mode. It will generally suffice to follow the circuit, in a detailed manner for merely one operation in the Alpha 1 mode, other similar operations of the translator device 40 in the Alpha 1 mode thus becoming readily apparent.

Now, having achieved the switching of the translator device into the Alpha 1 mode, the user of the telephone handset 30 might then desire to have the card punch print the letter A, for example, which necessitates the depression of key 2 upon the telephone handset 30 as is evident from a review of FIG. 8. Referring again to FIG. 2 of the drawings, depression of key 2 by itself produces an output having two frequency components A1 and B2 upon the telephone interconnection or transmission line 36. The tone-to-digital converter or data set 38 will respond to the presence of frequency components A1 and B2 by internally closing the circuit path between output conductors or lines A1 and A common and output conductors or lines B2 and B-common.

Referring now to FIG. 9, closure of the circuit paths A1 and B2 to their respective common lines serves to energize relay coils R1, R6, R8 and R9 in the manner discussed above,. Energization of the relay coils R8 and R9 serves to "inhibit" operation of the card punch-punch clutch 54 by virtue of the opening of the "punch clutch" conductor effected by the energization or switching of the relay contacts $r_{8-3}$ and $r_{9-3}$. Accordingly, as long as the user of the telephone handset 30 maintains the pushbuttons 34 in a depressed condition, the final operation within the card punch, that of actuation or release of the punches 56 by actuation of punch clutch 54 is "inhibited." As will be apparent, only when the user of the telephone handset 30 releases the particular depressed buttons 34 upon the keyboard 32, will the punch clutch be actuated to operate the selected punches. In this example, the user of the telephone handset 30 will be assumed to have maintained key 2 in a depressed state, at least while the following description continues. Relay coils R1, R6, R8, and R9 are now in a energized condition. It must also be remembered that relay coils R10 and R13 also are in an energized condition by virtue of the previous Alpha 1 shift of the translator device 40.

Referring now to FIG. 10, a circuit path from ground through the "card punch controlled ground switch" to selected outputs P will now be traced. As is apparent, a complete path from ground through the "card punch controlled ground switch" can be traced through the now switched or energized relay contacts $r_{8-1}$, and $r_{9-1}$, through $r_{20-3}$, through $r_{5-1}$, to contact $r_{6-1}$. However, contact $r_{6-1}$ is switched from the position shown into its energized or alternative position. Thus, a connection is made into the relay tree commencing with the relay contact $r_{6-1}$. Following the circuit further, a closed path would extend through $r_{6-1}$, $r_{4-2}$, $r_{3-2}$, $r_{2-2}$, to $r_{1-2}$. Relay contact $r_{1-2}$, however, is also switched into its alternative or energized position thus completing a path up to relay contact $r_{22-3}$. It is to be noted at this point, however, and from reference to FIG. 9, that relay contact $r_{22-3}$ is switched into its alternative or energized position as are all other relay contacts $r_{22}$ by virtue of a circuit path completed, in FIG. 9, from the source of supply through relay coil R22, through the energized relay contact $r_{10-10}$ through $r_{16-1}$ to ground.

Accordingly, referring again to the relay logic-tree and FIG. 10, the circuit path will extend through relay contact $r_{22-3}$ to the output conductor P12. Output conductor P12, as described above, runs directly into the card punch mechanism via conductor group 72 to selectively energize the interposer magnet within the magnet group 50 that causes punch 12 within the punch mechanism 56 to be set. Punch 12, however, cannot be operated until the punch clutch mechanism 54 is actuated, that is, until relay coils R8 and R9 are again nonenergized to release the punch "inhibit" function.

Additional circuit paths, in addition to the connection of output P12 with the card punch control ground also exist in this operation. Referring to the relay contact labeled $r_{20-3}$ in FIG. 10, a circuit path is found to exist through the diode attached thereto, to relay contact $r_{5-2}$, to the energized or switched relay contact $r_{6-2}$. Thus, an additional logic-tree is connected. Tracing the circuit through this logic-tree, a connection is completed from relay contact $r_{6-2}$, through $r_{4-5}$, $r_{3-5}$, $r_{2-5}$, through the switched or energized position of relay contact $r_{1-5}$, through $r_{12-7}$, $r_{11-7}$, through the energized or switched position of relay contact $r_{10-7}$, to the output conductor P1. Thus, it is seen that, at this point, depression of pushbutton 2 when the translator device is in the Alpha 1 mode, effects the connection of output conductors P1 and P12 of the translator to ground. Connection of the output conductor P1 serves to set the punch 1 within the card punch mechanism 56 in a fashion similar to the described effect of the connection of output conductor P12. Until the user of the telephone handset 30 releases the depressed key number 2, nothing more will happen, the only effect being that punches 1 and 12 within the card punch mechanism 56 have been "readied" or "set" and the "escapement mechanism" 52 within the card punch has operated to space the data card therein one unit to receive the eventual printing and punching of the desired character. At this point, the "card punch controlled ground switch" is opened by the card punch and disconnects the logic-tree circuitry of FIG. 10 in translator 40. Since this switch will not be closed again until punching actually takes place, nothing more can happen in the translator unit until the depressed button on the telephone keyboard is released. Thus, a first interlocking or internal inhibit function is provided.

Now, the user of the telephone handset 30 would release the depressed button 2, the release of which immediately serves to deenergize the relay coils of FIG. 9 with the exception of those held energized by the previous Alpha 1 shift operation. However, a very important feature of the subject invention enters into the operation of the translator device at this point. In this regard, it is to be noted that relay contacts $r_8$ and $r_9$ are actually "time delay" contacts. That is, these contacts will both close and open only after a specified inherent time delay. Thus, when a button was first pressed on the telephone keyboard R9 was energized, a certain delay time after R1, R6 and R8 thereby allowing the decoder sufficient time to "settle." Also, after all other contacts have been released back into their nonenergized or depicted positions in FIG. 9, relay contacts $r_9$ will remain in their energized state until $r_8$ returns to its normal (deenergized) state allowing the decoder to return to its normal condition. This feature accomplishes two purposes. For one, the punch clutch 54 within the card punch mechanism still is in an "inhibited" state for a specified period of time after release of the buttons on the keyboard. Thus, some degree of stabilization is afforded between the translator device 40 and the controlled card punch unit. As soon as the time delay relay contacts $r_8$ and $r_9$ release or revert back to their nonenergized positions, the punch clutch 54 is "released," causing the punch mechanism 56 to finally release or actuate the set punches 1 and 12 as described above as selected by outputs P1 and P12.

Referring now to FIG. 7, it will be seen that the energization of punches 1 and 12 of the punch mechanisms 56 corresponds to the printing only of the letter or character A upon the data card. If other letters or characters possible within the Alpha 1 mode of the translator device 40 were desired, a similar operation of the relay tree-logic circuitry would ensue culminating in the energization within the card punch of the proper punches 1 through 12 to effect printing of the desired character.

The procedure followed to shift the translator 40 into the other modes of operation, that is the Alpha 2 mode, Alpha 3 mode, or Numeric mode takes place in a manner similar to that described above in accordance with the coding technique depicted on the chart of FIG. 8. It will suffice to say that the simultaneous depression of buttons 5 and 6 upon the telephone keyboard 32 will cause the translator device 40 to shift into the Alpha 2 mode and the particular closure of the relay contacts within the translator can be traced by those skilled in the art in the fashion described above. Likewise, the connection of any of the output conductors P that serve to effect a "control" function within the controlled card punch causes the closure or actuation of selected relay contacts within the translator, the particular "control" functions again being effected through depression of buttons upon the keyboard 32 in accordance with the graph of FIG. 8. When the translator is in any of the above-described modes, Alpha or Numeric, data information respectively can be transmitted causing selective switching of the various relay contacts. Those skilled in the art will, likewise, be able to trace the particular circuit closings within the translator device so as to effect connection of any of the various outputs P with ground.

One further feature of operation of the subject inventive translator circuitry requires specific mention. As discussed above, the time delay operation of relays R8 and R9 serves to provide a measure of stability between the translator device 40 and the controlled card punch. Further stability and reliability of operation is effected by the provision of relay coil 21 as depicted in FIG. 10. The interconnection of the various logic circuitry depicted in FIG. 10 is such that whenever a simultaneous depression of two buttons upon the telephone keyboard 32 of a handset 30 occurs, relay coil 21 is actuated which causes the energization and closure of relay coils R20 and R21 as well as their associated contacts $r_{21\text{-}1}$, $r_{21\text{-}2}$, and $r_{20\text{-}3}$. Actuation or switching of relay contact $r_{20\text{-}3}$ effects a complete disconnection of the logic-tree circuitry from the ground of the "card punch controlled ground switch." This disconnection occurs after a slight time delay commenced from the initial simultaneous depression of two buttons upon the telephone keyboard 32. The time delay is of sufficient length such that the translator device 40 can be switched into its particular mode of operation prior to the actual operation or switching of relay contact $r_{20\text{-}3}$. The purpose of relays R21 along with R20 which effect the opening or switching of contact $r_{20\text{-}3}$ is to prevent false signals from being sent into the translator device and, accordingly into the card punch mechanism, if the user of the telephone handset 30 did not release simultaneously two previously depressed buttons, that is, not at the same time. Accordingly, the provision of the relays R8 and R9 as well as R20 and R21 provide the very important function of making the translator device unaffected by improper depression or release of the buttons 34 on the telephone keyboard 32. The inclusion of relays allows the user of the telephone handset 30 to achieve the same reliability of operation as would be achieved if the actual keyboard 48 of the card punch itself were utilized.

Summarizing the above operational characteristics of the translator device, the user thereof would:

1. "dial" the data set associated with the translator;
2. shift the translator into a desired operational mode by a command signal generated by a simultaneous depression of two buttons on a "pushbutton" telephone handset, and
3. transmit information data effecting desired operation of the controlled card punch.

The translator itself effectively shunts or bypasses the keyboard of a card punch and generates selective output circuit closings which actuate the internal components of the card punch. To effect stability of operation;

1. the logic-tree circuitry is disconnected as soon as the interposer magnets within the card punch are initially energized;
2. final actuation of the punches within the card punch is not effected until after the user of the translator releases previously depressed buttons on the telephone keyboard;
3. immediately after a shift or twin-depression signal is received by the translator unit and the selected internal circuits actuated, the internal circuits become unaffected by a staggered button release as they are immediately disconnected; and
4. a time delay always occurs after depression of buttons upon the telephone keyboard and after release of the buttons before operation takes place to account for staggered depression and release of buttons upon the telephone keyboard and other variations in button manipulation technique of different users of the system.

MISCELLANEOUS FEATURES

The subject invention contemplates still further features not specifically discussed above. An extra or additional frequency component having a frequency different from those of group A or group B might be generated by the telephone handset whenever a simultaneous depression of buttons occur. This extra frequency component would then be present only when a frequency component of the A-group or a frequency component of the B-group was generated singly and would serve to still further increase the operational reliability of the system since two tones or frequency components would then comprise every output signal from the telephone handset. This extra frequency component is contemplated to be derived from within the telephone handset itself on those handsets offering 16 or more button operation.

Additionally, although the subject invention discusses the simple utilization of "touch-tone" or pushbutton telephones throughout, it is to be appreciated that the control concepts expressed herein are compatible with the use of older, dial-type telephones with some modification. Specifically, an auxiliary tone generator capable of delivering the frequency components of the A and B groups in a fashion similar to that of the pushbutton telephone keyboard could be provided for use with each dial-type telephone. The user of this modified system would first effect interconnection of the dial-type telephone with the controlled computer device through a literal "dialing" operation and then manipulate the auxiliary tone generator so as to effect computer control as discussed above.

It should now be apparent that the objects initially set forth at the outset of this specification have been successfully achieved.

What is claimed is:

1. A system comprising:

a tone-generating telephone set having a number of actuatable members thereon, said telephone set producing tone signals having different frequency characteristics in dependence upon the actuation of said actuatable members either singly or simultaneously in groups;

logic circuit means coupled with said telephone set, said logic circuit means being responsive to the actuation of said actuatable members on said telephone set either singly or simultaneously in groups for producing a number of discrete signals, said logic circuit means including tone-to-digital converter means for converting said tone signals produced by said telephone set into digital information, translator means responsive to said digital information for producing said number of discrete signals;

said tone-to-digital converter means comprising means effecting selective connection of a plurality of output circuits, selected pairs of said plurality of output circuits being connected upon single actuation of various ones of said actuatable members on said telephone set, selected single ones of said plurality of output circuits being connected upon simultaneous actuation of various groups of said actuatable members on said telephone set;

said translator means being responsive to said selective circuit connections to produce said number of discrete signals;

said translator means including decoder means comprising a plurality of input conductors connected with said plurality of output circuits of said tone-to-digital converter means, a plurality of discrete decoder output lines; and selective logic circuit means coupled to said plurality of discrete input conductors for selecting various ones of said plurality of discrete decoder output lines in response to said selective connection of said plurality of output circuits of said tone-to-digital converter means, and inhibit means for inhibiting the response to said discrete signals until a depressed single actuable member on said telephone set is released.

2. A system as defined in claim 1 further including means for delivering tone signals to said telephone set indicative of the operation of said computer device means in response to release of a depressed actuable member on said telephone set.

3. A method of feeding data and command information so a computer mechanism adapted to process data information in accordance with command information, by means of a tone-generating telephone handset having a plurality of keys thereon operative when actuated individually to produce single signals having different frequency characteristics corresponding to the particular key depressed and operative when actuated simultaneously in groups to produce single signals having still different frequency characteristics corresponding to the particular group of keys simultaneously actuated, said method comprising the steps of:

a. actuating the keys individually to develop single signals representing one form of said information;

b. actuating the keys simultaneously in groups to develop single signals representing the other form of said information;

c. translating said single signals into computer command and date control signals;

d. feeding said computer command and data control signals to the computer mechanism in sequence to cause said computer mechanism to process said data information in accordance with said command information;

e. monitoring the computer mechanism by sending audio tones to said telephone handset indicative of the operation of said computer mechanism in response to said computer command and data control signals; and f. inhibiting the response to said developed signals until a depressed single key on said telephone set is released.

4. A system for controlling the operation of a computer device means in response to the actuation of keys on a tone-generating telephone set having a plurality of keys thereon, said computer device means being responsive to signals having at least first and second different signal or frequency characteristics, said system comprising:

signal-producing means responsive to the actuation of keys on said telephone set to selectively produce said signals having said at least first and second different characteristics, said signal-producing means selectively producing signals having said first different characteristics when in a first condition, said signal-producing means selectively producing signals having said second different characteristics when in a second condition;

shifting means responsive to the simultaneous actuation of selected groups of keys on said telephone set to selectively shift said signal-producing means into at least said first and second condition; and inhibit means for inhibiting the response of said computer device means to said signals having at least first and second different signal or frequency characteristics until a depressed single key on said telephone set is released.

5. A system as defined in claim 4, further including time delay means for respectively delaying said response of both said signal producing means and said shifting means for a predetermined time interval after said depression of single keys on said telephone set and after said simultaneous depression of selected groups of keys on said telephone set.

6. A system as defined in claim 4, wherein said shifting means includes holding means for maintaining said signal-producing means in a selected condition following said simultaneous actuation of said selected groups of keys on said telephone set.

7. A system as defined in claim 4, wherein said computer device means comprises card punch means responsive to said signals having said at least first and second different characteristics to respectively punch numeric and alpha data; said signal-producing means selectively producing signals having said first different signal or frequency characteristics when in said first condition whereby said card punch means punches numeric data in response thereto; said signal-producing means selectively producing signals having said second different signal or frequency characteristics when in said second condition whereby said card punch means punches alpha data in response thereto.

8. A system as defined in claim 4, wherein said telephone set includes a microphone portion and circuit responsive to external sound signals, said system further comprising noise exclusion means to selectively preclude response of said microphone portion and circuit.

9. A system as defined in claim 8, wherein said noise exclusion means comprises a circuit breaker means for selectively disconnecting said microphone circuit.

10. A system as defined in claim 8, wherein said noise exclusion means comprises a sound shield cap means adapted to fit over said microphone portion.

11. A system as defined in claim 1 for connection between (a) a telephone data set selectively effecting internal circuit closures therein in response to actuation of keys on said telephone set, and (b) a card punch machine having a plurality of punches therein, and comprising a translator device for effecting control of said card punch machine and said plurality of punches therein by said tone-generating telephone set;

a first group of relay coil means connected between a source of supply and said data set, respective coils of said first group of relay coil means being energized in response to said selective interval circuit closures within said data set;

a plurality of output line means adapted to be coupled with said plurality of punches of said card punch machine;

said logic circuit means including a plurality of relay contact means actuable by said first group of relay coil means for selectively energizing various ones of said plurality of output line means;

whereby selective punches of said plurality of twelve punches are actuated in response to actuation of keys on said tone-generating telephone set.

12. A system as defined in claim 1, wherein the number of said plurality of discrete signals is greater than the number of actuable members on said telephone set.

13. A system as defined in claim 1, wherein said selective logic circuit means of said decoder means comprises relay coil means coupled to said plurality of input conductors and selectively energizable singly and in pairs in dependence upon said selective connections of said plurality of output circuits of said tone-to-digital converter means; and relay contact means actuatable by said relay coil means to selectively provide said number of discrete signals on respective ones of said plurality of discrete decoder output lines.

14. A system as defined in claim 1, further including a controlled computer device; and wherein said translator means further comprises encoder means connected to said plurality of discrete decoder output lines for providing control signals for said computer device in response to said selection of various ones of said discrete decoder output lines.

15. A system as defined in claim 13, further including a controlled computer device; and wherein said translator means further comprises encoder means connected to said plurality of discrete decoder output lines for providing control signals for said computer device in response to said selective provision of said number of discrete signals on respective ones of said plurality of discrete decoder output lines.

16. A system as defined in claim 1, wherein the number of said plurality of discrete decoder output lines is greater than the number of actuatable members on said telephone set.

17. A system as defined in claim 14, wherein said controlled computer device comprises a card punch machine.

18. A system as defined in claim 15, wherein said controlled computer device comprises a card punch machine.

19. A system as defined in claim 4, wherein said signal-producing means is responsive to the actuation of single keys on said telephone set to selectively produce said signals having said at least first and second different signal or frequency characteristics.

20. A system as defined in claim 19, wherein said shifting means includes holding means for maintaining said signal-producing means in a selected condition following said simultaneous actuation of said selected groups of keys on said telephone set.

21. A system as defined in claim 20, wherein said computer device means comprises card punch means responsive to said signals having said at least first and second different signal or frequency characteristics to respectively punch numeric and alpha data; said signal-producing means selectively producing signals having said first different signal or frequency characteristics when in said first condition whereby said card punch means punches numeric data in response thereto; said signal-producing means selectively producing signals having said second different signal or frequency characteristics when in said second condition whereby said card punch means punches alpha data in response thereto.

22. A system as defined in claim 21 wherein said telephone set includes a microphone portion and circuit responsive to external sound signals, said system further comprising noise exclusion means to selectively preclude response of said microphone portion and circuit.

23. A system as defined in claim 22, wherein said noise exclusion means comprises a circuit breaker means for selectively disconnecting said microphone circuit.

24. A system as defined in claim 22, wherein said noise exclusion means comprises a sound shield cap means adapted to fit over said microphone portion.

25. A system as defined in claim 21 wherein said signal-producing means is responsive to the depression of single keys on said telephone set to selectively produce said signals having said at least first and second different signal or frequency characteristics.

26. A system as defined in claim 4, further including means for delivering tone signals to said telephone set indicative of the operation of said card punch means in response to release of a key on said telephone set.

27. A system as defined in claim 4 wherein said shifting means is responsive to the simultaneous depression of selected groups of keys on said telephone set to selectively shift said signal-producing means into at least said first and second condition.

28. A system as defined in claim 27, further including time delay means for respectively delaying said response of both said signal-producing means and said shifting means for a predetermined time interval after said depression of single keys on said telephone set and after said simultaneous depression of selected groups of keys on said telephone set.

29. A translator device as defined in claim 11, wherein said logic circuit means comprise a plurality of relay coil means; connecting means coupled between said plurality of input conductors and said relay coil means for energizing said plurality of relay coil means singly and in pairs in response to said circuit closures between various ones of said plurality of data output lines of said first and second data output channels of said data set; and relay contact means actuatable by said relay coil means for selectively energizing said plurality of discrete output terminals.

30. A translator device as defined in claim 11, further comprising first shift means actuated by predetermined ones of said plurality of relay contact means, said first shift means comprising a second group of relay coil means; and means coupling said first shift means to said logic circuit means for effecting selective energization of predetermined pairs of said plurality of output line means.

31. A translator device as defined in claim 30, further including second shift means actuated by predetermined ones of said plurality of relay contact means, said second shift means comprising a third group of relay coil means; and means coupling said second shift means to said logic circuit means for effecting selective energization of predetermined single ones of said plurality of output line means.

32. A translator device as defined in claim 31 further comprising time delay means for delaying energization of said various ones of said plurality of output line means for a predetermined time interval after said energization of said respective coils of said first group of relay coil means.

33. A translator device as defined in claim 31, further comprising switch means for selectively disconnecting said first shift means.

34. A translator device as defined in claim 31, further including means for delivering tone signals to said telephone set indicative of the operation of said card punch machine.

* * * * *